(12) United States Patent
Fujiwara

(10) Patent No.: US 6,199,704 B1
(45) Date of Patent: Mar. 13, 2001

(54) SLUDGE COLLECTING APPARATUS

(76) Inventor: Michihiro Fujiwara, 1-4-5, Sakaigawa, Nishi-ku, Osaka-shi, Osaka (JP)

( * ) Notice: Subject to any disclaimer, the term of this patent is extended or adjusted under 35 U.S.C. 154(b) by 0 days.

(21) Appl. No.: 09/347,831

(22) Filed: Jul. 2, 1999

(30) Foreign Application Priority Data

| Jul. 4, 1998 | (JP) | ................................................. 10-225119 |
| Aug. 29, 1998 | (JP) | ................................................. 10-283241 |
| Oct. 12, 1998 | (JP) | ................................................. 10-327424 |

(51) Int. Cl.[7] ................................................. B01D 21/18
(52) U.S. Cl. ........................ 210/525; 210/527; 210/541; 198/741
(58) Field of Search ........................ 210/523, 525, 210/527, 541; 198/741, 746

(56) References Cited

U.S. PATENT DOCUMENTS

| 2,099,654 | * | 11/1937 | Lund | ..................................... 210/527 |
| 2,305,929 | * | 12/1942 | Lund et al. | ........................... 210/525 |
| 2,381,185 | * | 8/1945 | Rogers et al. | ....................... 210/527 |
| 2,866,557 | * | 12/1958 | Easterday | ............................... 210/527 |
| 3,498,466 | * | 3/1970 | Fechter et al. | ....................... 210/525 |
| 4,724,088 | * | 2/1988 | Zetterlund | ............................ 210/525 |
| 5,047,150 | * | 9/1991 | Mitchell | ................................. 200/525 |
| 5,454,942 | * | 10/1995 | Ljungberg | ............................ 210/527 |
| 5,478,471 | | 12/1995 | Fujiwara | ............................... 210/527 |

FOREIGN PATENT DOCUMENTS

603496 * 8/1978 (CH).

* cited by examiner

Primary Examiner—Christopher Upton
(74) Attorney, Agent, or Firm—Webb Ziesenheim Logsdon Orkin & Hanson, P.C.

(57) ABSTRACT

A sludge collecting apparatus comprising: a vehicle body which is long in advance/retreat directions and has driving means; and a plurality of scrapers which are disposed at intervals in the advance/retreat directions including a sludge scraper which is most advanced to the sludge collecting pit side and performs a collecting operation to collect and drop sludge into the sludge collecting pit and following sludge scrapers which perform a collecting operation, the front and rear sludge scrapers have the relation such that the collecting state and the noncollecting state are interlockingly switched, the interval between the neighboring front and rear sludge scrapers is shorter than the advance/retreat stroke of the vehicle body, the following sludge scraper in the collecting motion pushes the sludge toward the sludge collecting pit further than the return position of the advanced sludge scraper in the collecting motion, and the most advanced sludge scraper sequentially collects and drops the sludge collected by the following sludge scrapers in the collecting motion.

14 Claims, 29 Drawing Sheets

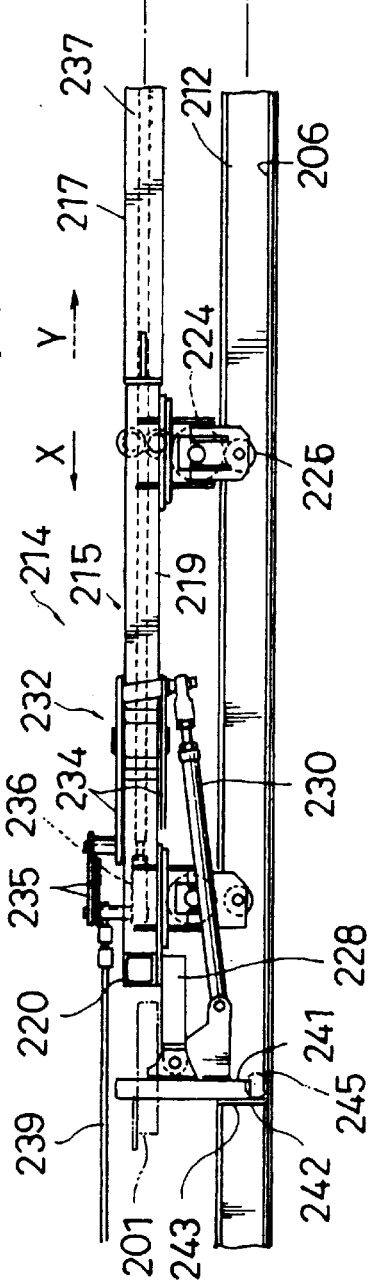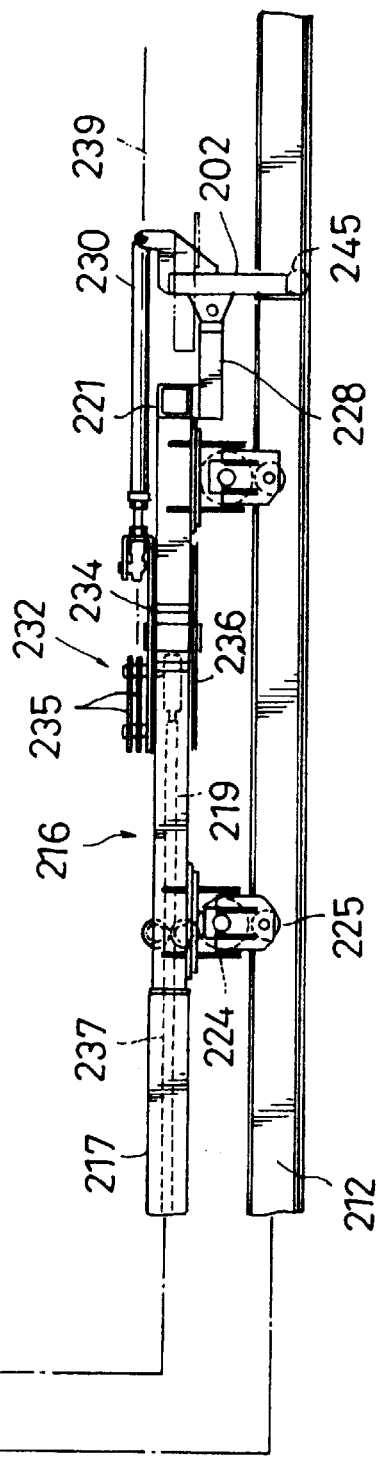
FIG.20

SLUDGE COLLECTING APPARATUS

BACKGROUND OF THE INVENTION

1. Field of the Invention

The present invention relates to a sludge collecting apparatus and, more particularly, a sludge collecting apparatus which operates to remove deposited sludge by repeatedly moving forward and backward along the underwater bottom of a treatment tank having an almost rectangular shape in plan view such as a sedimentation tank or an aeration tank.

2. Description of the Related Art

In a treatment tank such as a sedimentation basin or an aeration tank, sludge deposited on the bottom is collected by a sludge collecting apparatus to a sludge collecting pit and is removed to the outside of the tank by pumping-up or the like.

A general sludge collecting apparatus called a flight sludge collecting apparatus has a number of flights each having a band plate shape which is long in the tank width direction. The flights are moved along the bottom by chain driving and circulated so as to come close to the water surface and the bottom face. During the flights' move along the bottom face of the tank, the sludge on the bottom face of the tank is collected to the sludge collecting pit. On the other hand, during the flights' move along the water surface, scum floating on the water surface is pushed toward a scum removing apparatus. The flight type sludge collecting apparatus is, however, a very complicated apparatus and is a main cause of the high cost. Moreover, it has many problems in maintenance.

A sludge collecting apparatus of a type such that a vehicle body which moves forward and backward along the bottom of a tank is provided with sludge scrapers, and the apparatus can be switched between a state where sludge is collected when the scrapers are oriented downward and a state where sludge is not collected when the scrapers are lifted is provided.

The length of a general sedimentation basin is 30 m or longer. The sludge collecting apparatus has, however, a very short vehicle body having the length of about 2 m usually with only one sludge scraper. The apparatus travels forward from the return position on the side opposite to the pit to the sludge collecting pit and travels backward to the return position. When such a short sludge collecting apparatus is employed, the operation stroke is very long.

As a result, even if a stroke is long, there is little problem when an amount of deposition is small and an amount of collection is small. When the deposition amount and collection amount increase largely to extensive rainfall, the apparatus cannot deal with the sludge at a slow collecting speed. Consequently, it is necessary to shorten the cycle time by increasing the speed of the vehicle body. When the speed of the vehicle body is increased, the sludge being collected is agitated in front of the sludge scraper, moves over the sludge scraper, or agitated upward. It is consequently feared that it disturbs a depositing action of the sludge.

When the sludge collecting apparatus is driven forward/backward by using a wire rope from above the tank, since the vehicle body is short and light, the vehicle body easily floats and the light vehicle body is moved before the sludge scraper is up/down switched and an unpreferable situation such that the apparatus travels forward/backward without switching the sludge scraper occurs.

Further, when the sludge collecting apparatus having the short vehicle body travels forward and backward in the overall length of the tank, a stay formed upright on the apparatus also travels a long distance in the longitudinal direction of the tank, so that it is necessary to avoid interference of a scum scraper with a scum removing apparatus provided at some midpoint. It is therefore necessary to form a bent stay or provide the bottom of the scum removing apparatus with a guide to avoid the scum scraper. Consequently, not only the structure is complicated and the cost is high, but also the number of elements which make the operation unstable increases, so that it may cause trouble.

The invention has been achieved to solve the problems of the conventional techniques and it is an object of the invention to provide a sludge collecting apparatus which can certainly perform the collecting operation even if the deposition amount increases and which does not disturb the deposition action by the collection.

It is another object of the invention to provide a heavy stable apparatus by using a long vehicle body, in which the posture of the sludge scraper is switched first and then the vehicle body is driven, thereby minimizing malfunctions.

It is further object of the invention to provide a sludge collecting apparatus with scum scrapers which can be easily adapted to the circumstances of a treatment tank under the condition such that the advance/retreat stroke for collecting scum is short relative to the length of a sedimentation basin, since the advance/retreat stroke of the scum scraper can be shortened by making the vehicle body long, using a plurality of sludge scrapers, and shortening the advance/retreat stroke.

SUMMARY OF THE INVENTION

A sludge collecting apparatus of the invention is characterized by comprising: a vehicle body with driving means which is disposed in a treatment tank such as a sedimentation basin having a sludge collecting pit in a predetermined part in the longitudinal direction of the bottom having a shape of an almost rectangle in plan view and is oriented in the longitudinal direction and which can advance/retreat to/from the collecting pit by a motion parallel to the bottom; a sludge scraper which is attached to the vehicle body and can be switched between a collecting state of collecting the sludge deposited on the bottom and a noncollecting state in which the scraper keeps its escaping state above the sludge, for collecting sludge deposited on the bottom toward the sludge collecting pit and returning to the noncollecting state in the opposite direction, wherein the vehicle body is formed so as to be long in the advance/retreat directions, and the sludge scraper is made up of a plurality of scrapers which are disposed at intervals in the advance/retreat directions including the most advanced sludge scraper performs a collecting operation to collect and drop sludge into the sludge collecting pit and a subsequent sludge scraper which performs a collecting operation, the front and rear sludge scrapers have the relation such that the collecting state and the noncollecting state can be simultaneously performed, the interval between the neighboring plurality of front and rear sludge scrapers is shorter than the advance/retreat stroke of the vehicle body, the subsequent sludge scraper in the collecting motion pushes the sludge to the sludge collecting pit further than the return position of the advanced sludge scraper in the collecting motion, and the most advanced sludge scraper sequentially collects and drops the sludge collected by the subsequent sludge scrapers in the collecting motion.

According to the construction, even when the deposition amount increases, the collecting operation can be reliably performed, and the deposition action is not disturbed by the collecting operation.

Further, the apparatus is made heavier and stabler by using the long vehicle body, the posture of the sludge scraper is switched first and then the vehicle body is driven forward and backward, thereby enabling the operation to be reliably performed.

Since the advance/retreat stroke of the scum scraper can be shortened by shortening the advance/retreat stroke of the apparatus in such a manner that the vehicle body is shortened and a plurality of sludge scrapers are used, a sludge collecting apparatus with scum scrapers which can easily adapt to the conditions of a sedimentation tank under which the advance/retreat stroke for collecting scum is short relative to the length in the longitudinal direction of the sedimentation tank can be provided.

Preferably, the vehicle body is provided with lever means in both a front part as the sludge collecting pit side and a rear part as the opposite side. The lever means are supported so as to be swingable forward and backward in the advance/retreat directions, in parallel to each other in a state where a midpoint of each of the lever means is supported, with the rotational center being oriented in the width direction of the vehicle body. The front and rear lever means are coupled via interlocking means. The front and rear lever means are switched between forward swing and rearward swing by driving means which drive the lever means forward and rearward, thereby interlockingly switching the sludge scrapers between the collecting state and the noncollecting state.

According to the construction, the collecting and noncollecting states can be certainly switched by the front and rear lever means and the interlocking means.

Preferably, the vehicle body is provided with lever means in both a front part as a sludge collecting pit side and a rear part on the opposite side. Each lever is supported so as to be swingable around the vertical shaft, and the front and rear lever means are coupled via interlocking means. The front and rear lever means are switched between forward swing and rearward swing by driving means which drive the lever means forward and rearward, thereby interlockingly switching the sludge scrapers between the collecting state and the noncollecting state.

According to the construction, the lever means can be formed so as to move in parallel using wide plane space, so that a power linking mechanism can be employed. Even if the driving power of the lever means is small, a large force can be generated to easily lift the sludge scraper. Since this makes an operation of switching the sludge scraper easy, the operation of switching the sludge scraper can be performed prior to the forward/backward travel of the vehicle body.

It is preferable that the interlocking means is a wire rope, a rod, or a chain since each of the elements certainly moves the lever means interlockingly.

Preferably, the vehicle body and/or the sludge scraper are/is moved by driving means which is rotated in water.

Such a construction is convenient since the structure is not complicated unlike the case where the vehicle body is moved forward/backward by a wire member such as a wire rope or chain and, moreover, there is no fear that the wire member itself is worn or its quality deteriorates due to sewage.

Preferably, a scum scraper is provided above the vehicle body so as to accompany the vehicle body, which enters a scum noncollecting state where the scum scraper is escaped from the water surface when the vehicle body is in the sludge collecting state, and enters a scum collecting state when the vehicle body is in the sludge noncollecting state.

According to the construction, when the scum scraper is attached to the vehicle body, it is unnecessary to separately provide a scum collecting apparatus above a tank and both the sludge collecting apparatus and the scum collecting apparatus can be constructed simply in a lump.

Preferably, the vehicle body can advance and retreat in the longitudinal direction of the tank along the guide rail laid on the bottom of the tank.

According to the construction, the vehicle body and the sludge scraper can be stably moved forward and backward. Particularly, even when the collecting amount becomes excessive, the sludge scraper advances and retreats linearly, so that stable driving can be guaranteed.

Further, it is preferable that the guide rail is a single guide rail laid in the advance/retreat directions of the vehicle.

According to the construction, the apparatus can be easily and certainly built at a site. The vehicle body and the sludge scraper can therefore move forward and backward stably and the apparatus is advantageous also from the viewpoint of costs.

It is preferable that the vehicle body is divided in a plurality of parts and the parts are coupled by coupling members.

According to the construction, even if a place where a sludge collecting process is performed is large, by constructing a long and large-sized vehicle body, sludge can be efficiently collected.

BRIEF DESCRIPTION OF THE DRAWINGS

FIG. 20 is a front view of the sludge collecting apparatus of FIG. 19;

DETAILED DESCRIPTION OF THE PREFERRED EMBODIMENTS

Embodiments of a sludge collecting apparatus according to the invention will be described in detail with reference to the drawings.

(1) The First Embodiment

Figure 1:
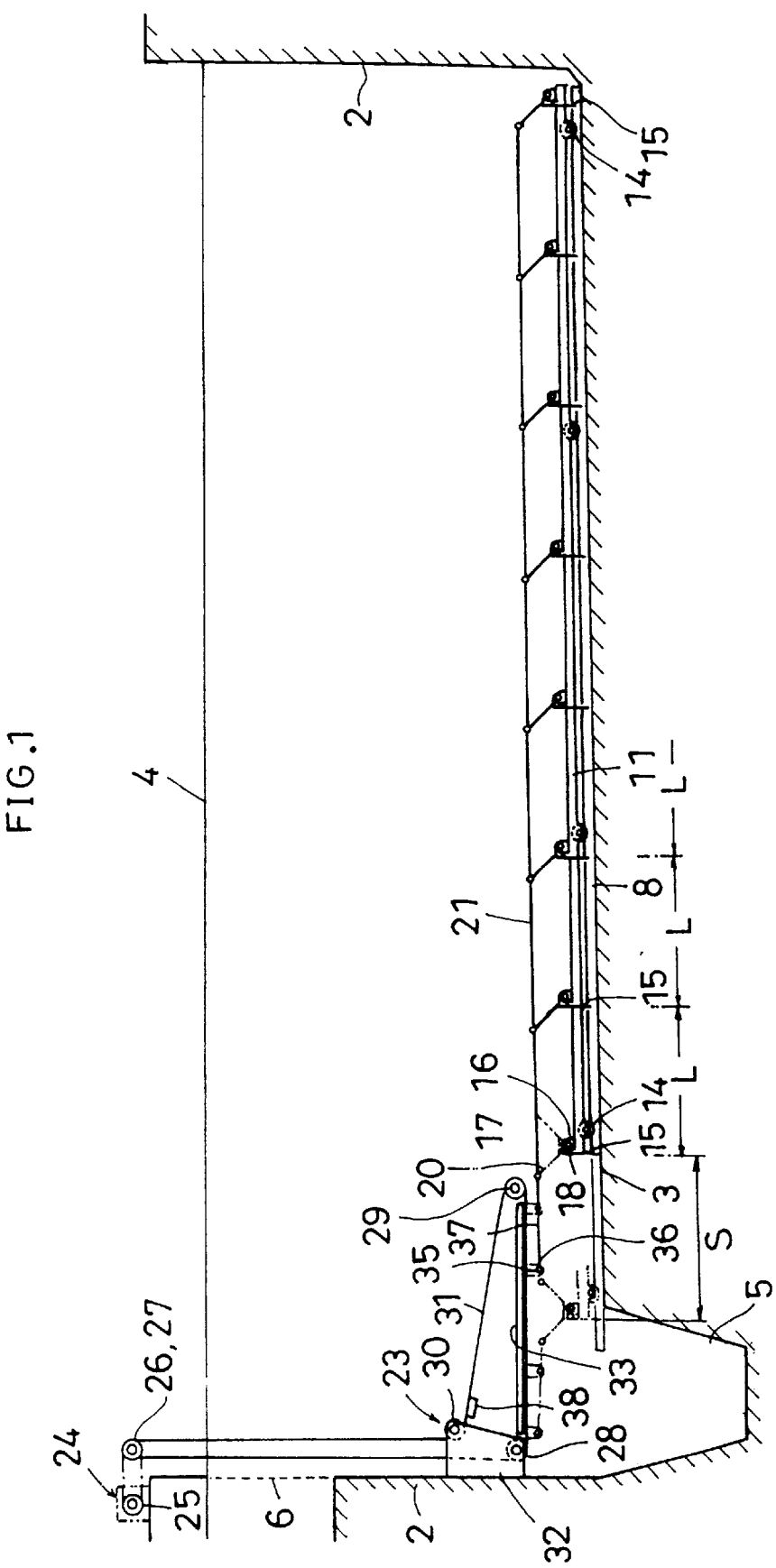
FIG. 1 is a front view of a sludge collecting apparatus according to the first embodiment of the invention, disposed in a treatment tank.
Figure 2:
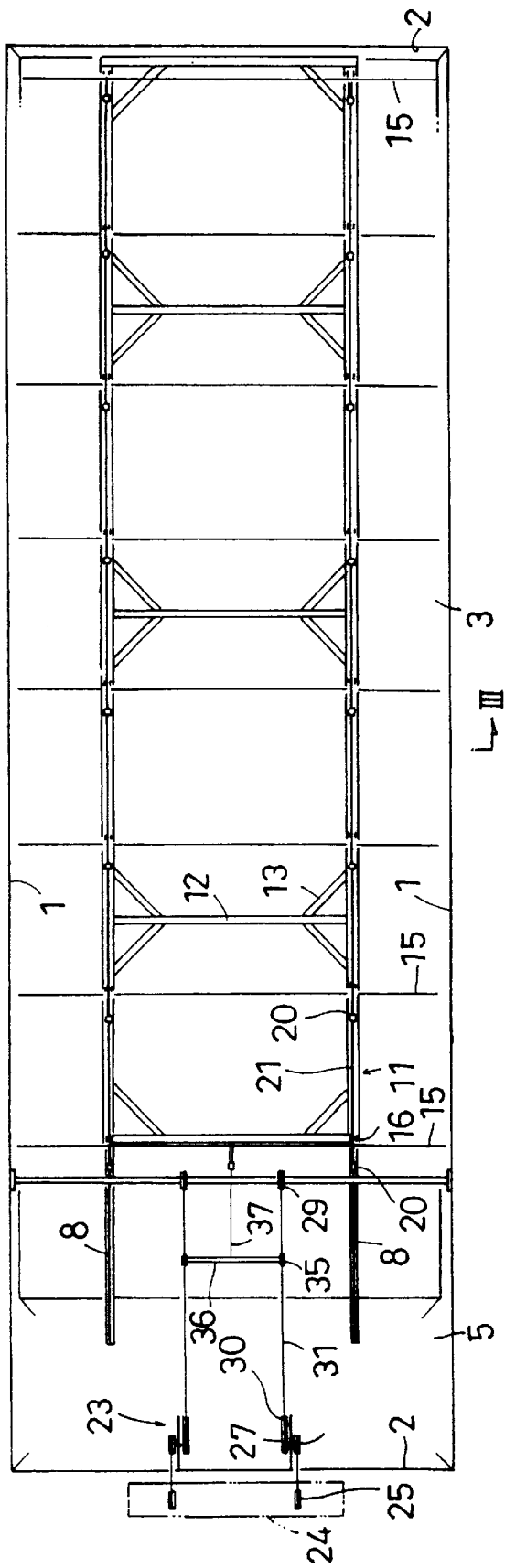
FIG. 2 is a plan view of the sludge collecting apparatus of FIG. 1 disposed in the treatment tank.
Figure 3:
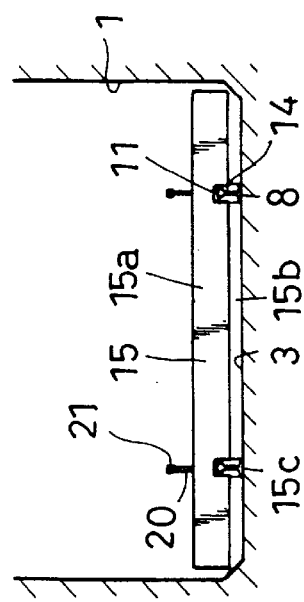
FIG. 3 is a side view of the sludge collecting apparatus of FIG. 1 disposed in the treatment tank.

FIGS. 1 to 3 show a sludge collecting apparatus of the first embodiment. First, the embodiment is carried out to a treatment tank such as preliminary sedimentation tank, final settling tank, or aeration tank. The treatment tank of a rectangular shape in plan view has, as illustrated in FIG. 2, side walls 1 on both sides in the longitudinal direction and front and rear end walls 2 which perpendicularly cross the side walls 1.

Although the bottom 3 of the treatment tank is almost parallel to the water surface 4 in FIG. 1, it can be inclined downward to the side of a sludge collecting pit 5 at one end at a very small angle (for example, about 10 cm per 10 m of the length). Reference numeral 6 denotes a sewage introducing port. The amount of sewage introduced into the treatment tank via the sewage introducing port 6 fluctuates according to an amount of rainfall since it is introduced from a river in the case of the embodiment.

On the bottom 3 of the treatment tank, as illustrated in FIG. 3, a pair of right and left triangle-shaped guide rails 8 with the longitudinal direction corresponding to the longitudinal direction of the tank are fixed at a large interval. The interval between the guide rails 8 may be narrower or wider than that shown in the diagram. The number of the guide rails 8 is not limited to two as shown in FIG. 3. A single guide rail 8 may be laid in the center position of the width of a tank. The number may be three or more. Each guide rail 8 is of a longitudinal-direction connection type. Various commercially-available steel members each having a cross sectional shape of square, round, H, I, or the like may be used as the guide rails 8.

Along the guide rails 8, the vehicle body 11 of the sludge collecting apparatus can move forward and backward as shown in FIGS. 1 and 2. The vehicle body 11 is formed by a frame which is very long in the travel direction with respect to the length of the treatment tank. As the structure in plan view is shown in FIG. 2, the vehicle body 11 is formed in a rectangular frame which is long in one direction by using proper steel members (such as almost C-letter shaped steel members) and integrally assembling proper laterally bridging members 12 . . . and diagonally placed stiffening members 13 . . . within the frame.

The vehicle body 11 may be of a split type consisting of front and rear parts which are connected via a connector at the site. The length of the vehicle body 11 after connection is approximately 25 m (or approximately 30 m but the length is according to the length of the treatment tank and is not limited) and the length of the treatment tank is approximately 30 m in this case. The vehicle body 11 can be constructed by a single steel material having a shape of H, I, angular pipe, round pipe, or the like whose longitudinal direction is made to correspond to the longitudinal direction of the tank. In this case, driving wheels 14 as driving means may be arranged on the right and left sides of the vehicle body 11 or only in the center line.

The vehicle body 11 has, as shown in FIGS. 1 and 3, the driving wheels 14 four each on right and left sides so the upper part of each of the driving wheels 14 is housed in the groove of the vehicle body 11. The driving wheel 14 has a V groove on the outer periphery so as to be fit in the guide rail 8 and so as not to be deviated from the rail.

The vehicle body 11 has a plurality of sludge scrapers 15 . . . in the front and rear parts. Each of the sludge scrapers 15 has, as shown in FIG. 3, a blade 15a, a collecting rubber board 15b, and right and left grooves 15c so as not to interfere with the vehicle body 11 and the like.

As illustrated in FIG. 1, on the right and left frame members of the vehicle body 11, stationary brackets 16 . . . are fixed at predetermined intervals in the travel direction. By coupling the pair of right and left brackets 16 . . . and rotary brackets 18 on the sludge scraper 15 side via a scraper shaft 17, the sludge scraper 15 is lifted.

Interlocking levers 20 . . . as lever means are provided upright in a pair at the upper end of the sludge scraper 15. An interlocking link 21 is provided to connect the interlocking levers 20 in the travel direction so as to be in a series. The interlocking links 21 are provided in a pair on the right and left sides as shown in FIG. 2.

As shown in FIG. 1, the sludge scraper 15 is switched between a collecting (advance) state where the sludge scraper 15 is directed downward almost vertically and a noncollecting (retreat) state where the lower part of the sludge scraper 15 is lifted to almost the horizontal. The sludge scraper 15 is regulated so as not to turn more than each of the angles of the above states. For example, in the vertical collecting state, the front end surface of the vehicle body 11 functions as a stopper, thereby preventing the sludge scraper 15 from turning backward more than that. In the horizontal noncollecting state, the rotary bracket 18 comes into contact with the stationary bracket 16, thereby regulating the turn more than that.

The interval L in the travel direction of the neighboring sludge scrapers 15 . . . in the vertical state is constant. In the collecting state, as shown in FIG. 1, the sludge scraper 15 advances or retreats about a stroke S. S is larger than L. A driving system 23 is mounted above the sludge collecting pit 5 and makes the sludge scrapers 15 advance or retreat and lift or return.

The driving system 23 has a driving source 24 which can reciprocate on the top surface of the tank. The driving source 24 has a pair of right and left first wheels (sprockets or the like) 25 and drives coaxial third wheels 27 via the first wheels 25 and second wheels 26. A pair of right and left power transmission members 31 as chains (wire ropes or the like) run so that the power is transmitted from the third wheels 27 so as to return to the third wheels 27 via fourth wheels 28, fifth wheels 29, and sixth wheels 30 which are positioned below. The fourth and sixth wheels 28 and 30 are supported by brackets 32 for driving. On the other hand, the fifth wheels 29 are, as shown in FIG. 2, rotatably supported by a rotary shaft (or a stationary shaft) laid across the side walls 1 and 1. Reference numeral 33 denotes a guide rail disposed on the top face between the fourth and fifth wheels 28 and 29.

In the part between the fourth and fifth wheels 28 and 29 of the transmission member 31, a pair of right and left shaft stoppers 35 are provided. An interlocking rod 37 is connected between the midpoint in the width direction of a shaft 36 laid between the shaft stoppers 35 and the midpoint in the width direction of the most advanced sludge scraper 15. Although the power transmission member 31 is provided with a weight (or flight) 38 to obtain tension, obviously, the invention is not limited to the weight 38 and other mechanical tension applying means can be used.

The solid lines shown in FIGS. 1 to 3 denote the time point when the apparatus has entered the collecting state. In the collecting state, all of the sludge scrapers 15 are vertical, the interlocking levers 20 are forward inclined, and the shaft stoppers 35 are in advanced positions about one third more than the fifth wheels 29.

At this time point, the driving system 23 is under operating conditions. When the driving system 24 is driven to rotate clockwise in FIG. 1, the interlocking rod 37 is pulled to the left. Since the sludge scraper 15 is driven to the left from the solid line state only by about the stroke S and the stroke S is larger than the interval in the travel direction of the neighboring sludge scrapers 15, the sludge scraper 15 on the rear side moves forward further than the advanced sludge scraper 15 and the most advanced sludge scraper 15 comes above the sludge collecting pit 5. By advancing in such a manner, sludge is collected and dropped by the most advanced sludge scraper 15 and is sent to a forward position by about the stroke S by the rear sludge scrapers 15 . . . .

After that, the driving source 24 is reversely rotated, the interlocking rod 37 is returned from the state shown by an imaginary line in FIG. 1, the interlocking lever 20 is switched from the forward-inclined state to the rearward-inclined state, and the sludge scrapers 15 are returned to be horizontal. Further, when the driving source 24 is driven, the sludge scrapers 15 remain lifted and the vehicle body 11 is stopped in a position returned by about the stroke S.

After that, the driving source 24 is again driven to turn clockwise in FIG. 1, thereby advancing the interlocking lever 20 to the solid line. Consequently, the sludge scrapers 15 are returned from the horizontal state to the vertical collecting state. By repeating such a cycle, the sludge sent forward by a certain sludge scraper 15 is sent further forward by the next sludge scraper 15 which is on the front side. Finally, the sludge is sent to the sludge collecting pit 5 by the most advanced sludge scraper 15.

[Other Embodiments]
(2) The Second Embodiment

Figure 4:
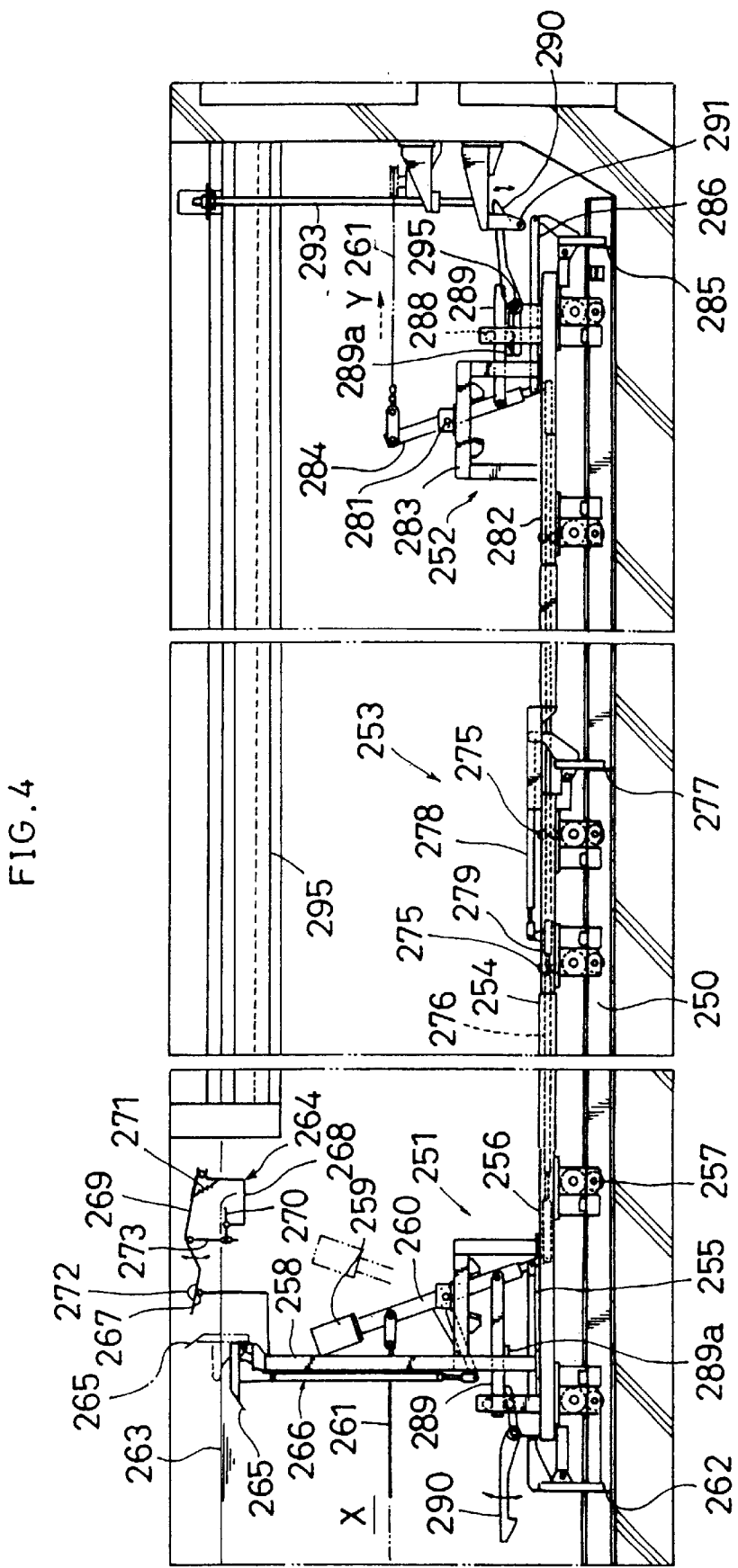
FIG. 4 is a front view of a sludge collecting apparatus according to the second embodiment of the invention, disposed in a treatment tank.
Figure 5:
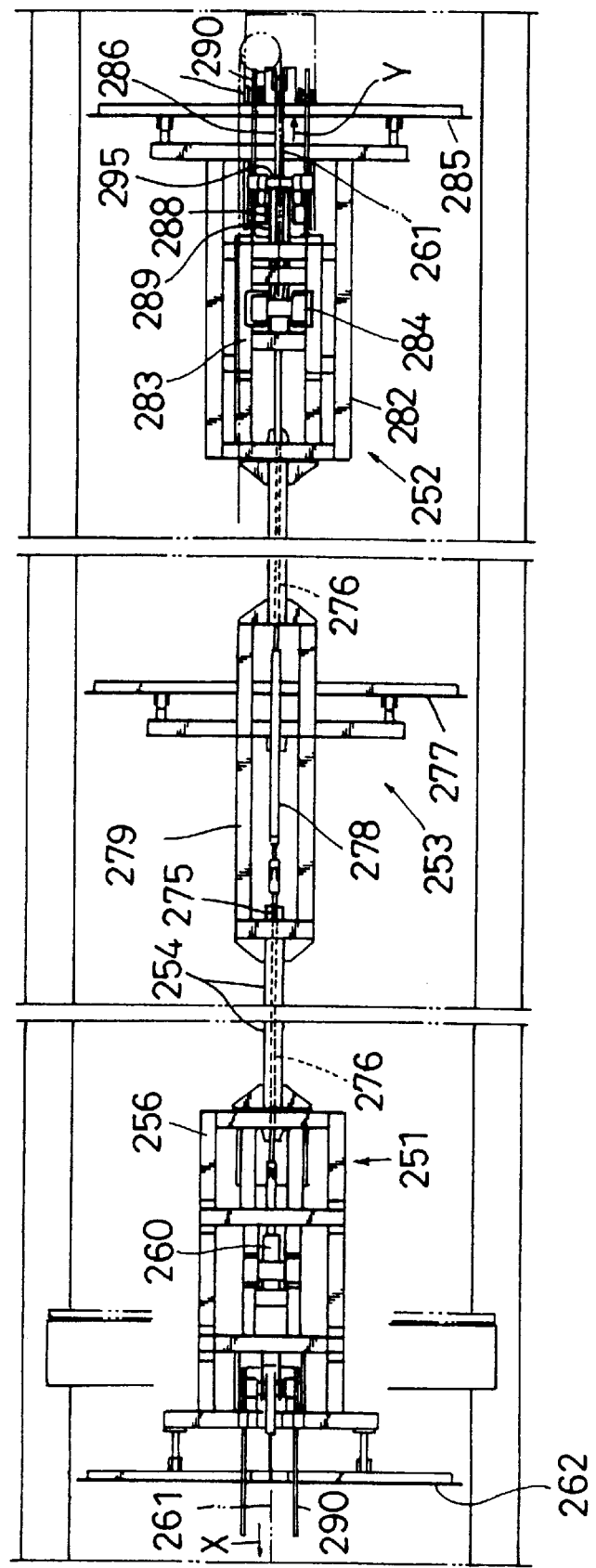
FIG. 5 is a plan view of the sludge collecting apparatus of FIG. 4 disposed in the treatment tank.

FIGS. 4 and 5 show a long-type sludge collecting apparatus having a long vehicle body. A guide rail 250 of the sludge collecting apparatus is a mono-rail in the center in the width direction of the tank. The shape in the cross section of the guide rail 250 is an H letter with grooves facing to the sides. As mentioned above, the guide rail 250 may be constructed by a pair of right and left pair of rails. The sludge collecting pit is provided on the left side of each of the drawings (out of the drawings).

The sludge collecting apparatus is comprised of three (or more) parts of a front part 251, a rear part 252, and an intermediate part 253. The three parts are connected integrally by front and rear connecting members 254. They can be coupled by pins or the like.

Figure 6:
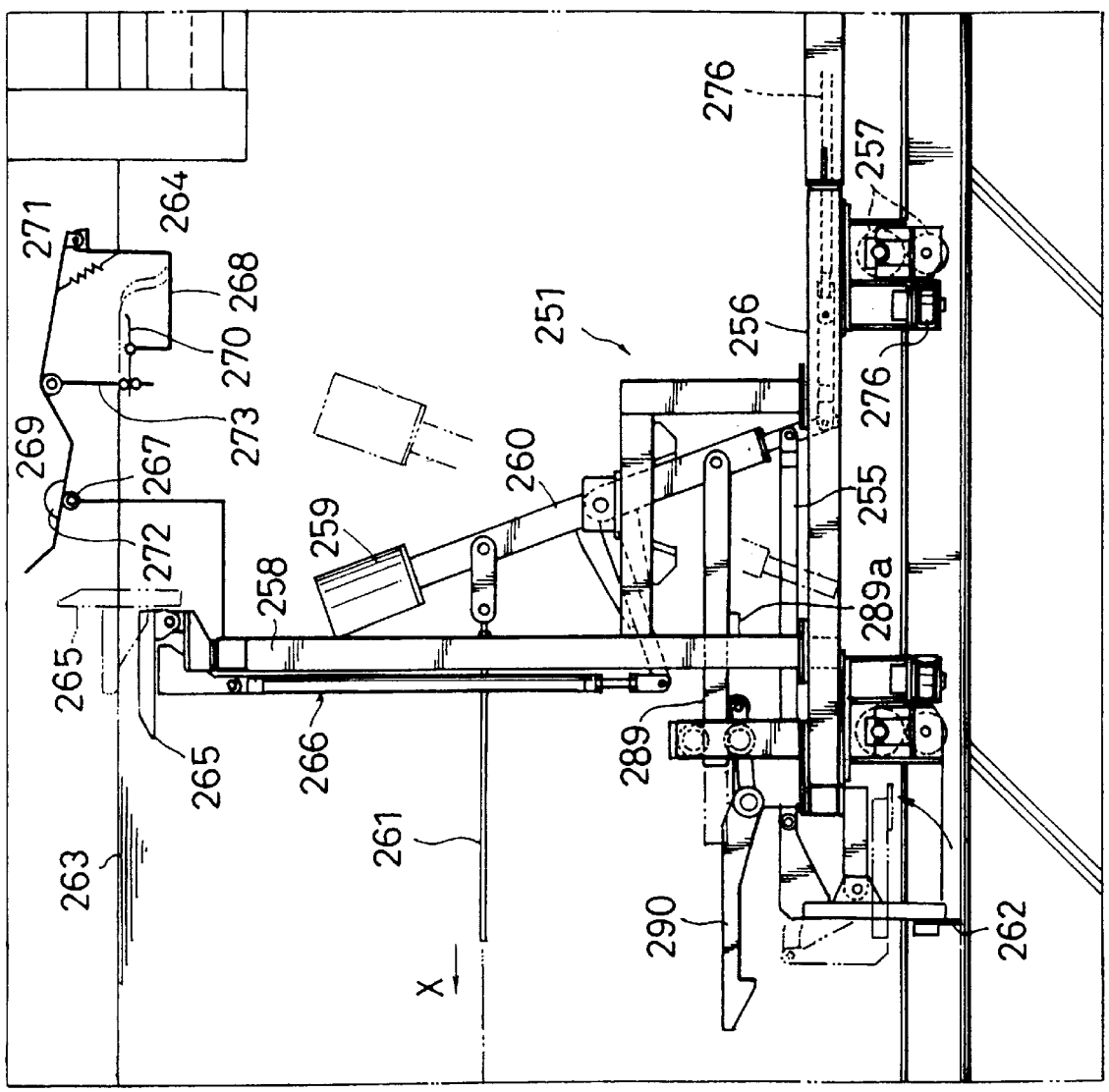
FIG. 6 is an enlarged front view of a front portion of the sludge collecting apparatus of FIG. 4.
Figure 7:
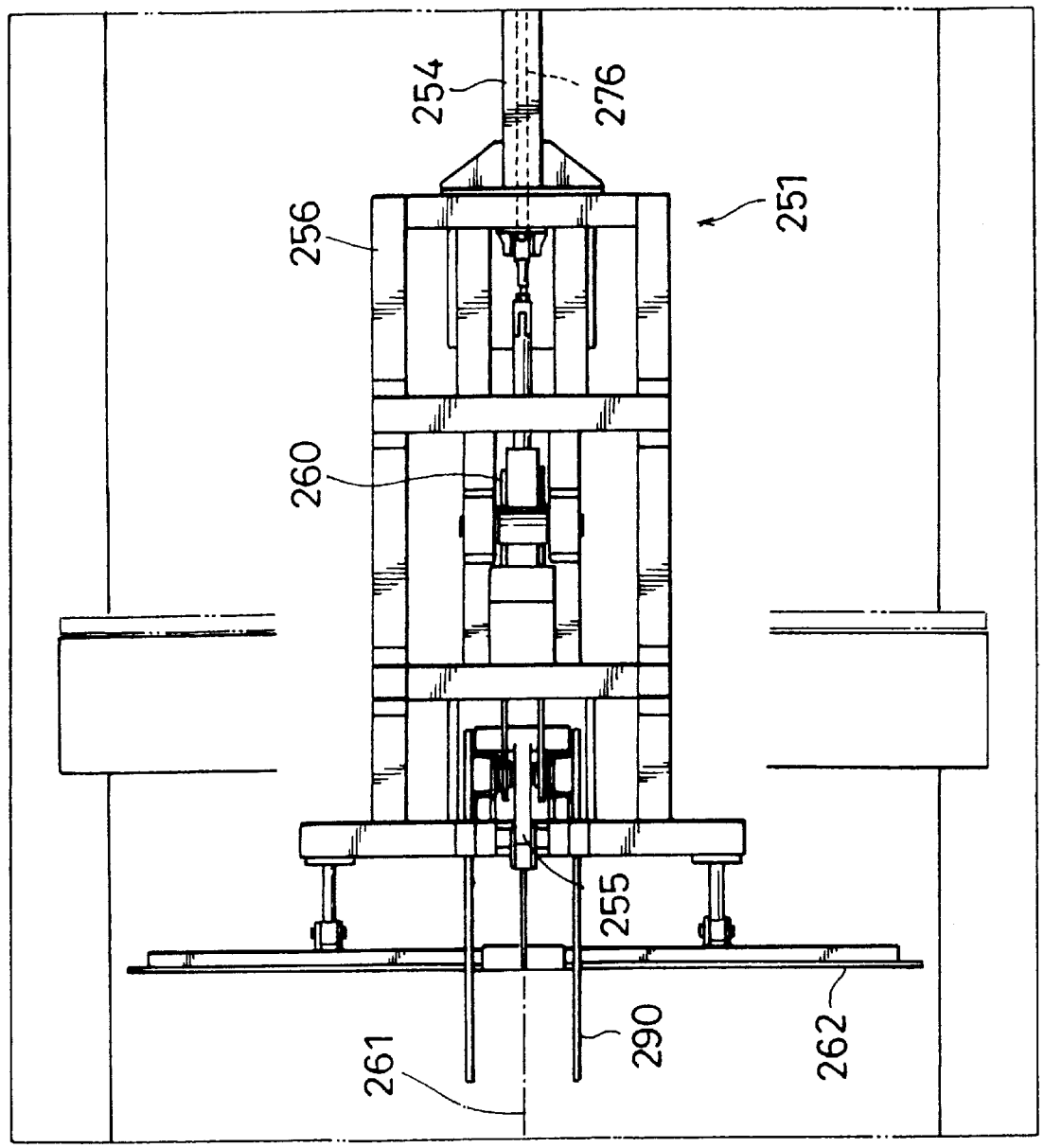
FIG. 7 is an enlarged plan view of the front portion of the sludge collecting apparatus of FIG. 4.

FIGS. 6 and 7 enlargedly show the details of the front part 251. In the front part 251, a stay 258 is provided upright on the front body 256 having rollers (driving wheels) 257 . . . such as driving rollers, derail preventing rollers, and side rollers. A swing lever 260 having a horizontal rotary shaft and a weight 259 is provided to a lower part of the stay 258. The swing lever 260 is supported around the horizontal shaft as a center so as to swing in the travel direction. An interlocking link 255 is connected to the lower end of the swing lever 260 so as to be able to interlockingly move the most advanced sludge scraper 262.

The upper part of the swing lever 260 is pulled to the left by a wire rope 261, thereby making the most advanced sludge scraper 262 enter the vertical collecting state as shown by the solid line in FIG. 6.

A scum collecting apparatus is formed in the stay 258. A scum scraper 265 becomes horizontal at the time of sludge collection shown by the solid line in FIG. 6 and does not collect scum on the water surface 263. When the sludge scraper 262 is lifted as shown by imaginary lines in FIG. 6 and returned to the right in the diagram in the noncollecting state, the scum scraper 265 becomes upright to push scum toward a sum removing apparatus 264 on the right side. The scum scraper 265 moves interlockingly with the swing lever 260 via a scraper interlocking mechanism 266 and performs the upright and tilt operation which is opposite to the sludge scraper 262.

As shown in FIG. 4, an operation roller 267 is provided projectingly from the stay 258. The operating roller 267 lifts up a cam 269 supported by a trough 268 and presses a weir 270 to or under the water surface. When the driving roller 267 escapes to the right in the diagram, the weir 270 is floated by a spring 271, a weight 272, and the like, thereby obtaining a scum stopping state. Reference numeral 273 is a coupling rod. The scum removing apparatus 264 of another type which interlockingly moves the weir 270 can be also used.

The front end of an interlocking rod (interlocking means) 276 guided by a roller 275 is connected to the lower end of the swing lever 260 and a sludge scraper 277 in the intermediate part 253 is interlockingly moved. The sludge scraper 277 is a following scraper which moves interlockingly with the interlocking rod 276 via an operating rod 278 and switched between a lifted state and a downward state simultaneously with the most advanced sludge scraper 262.

Figure 8:
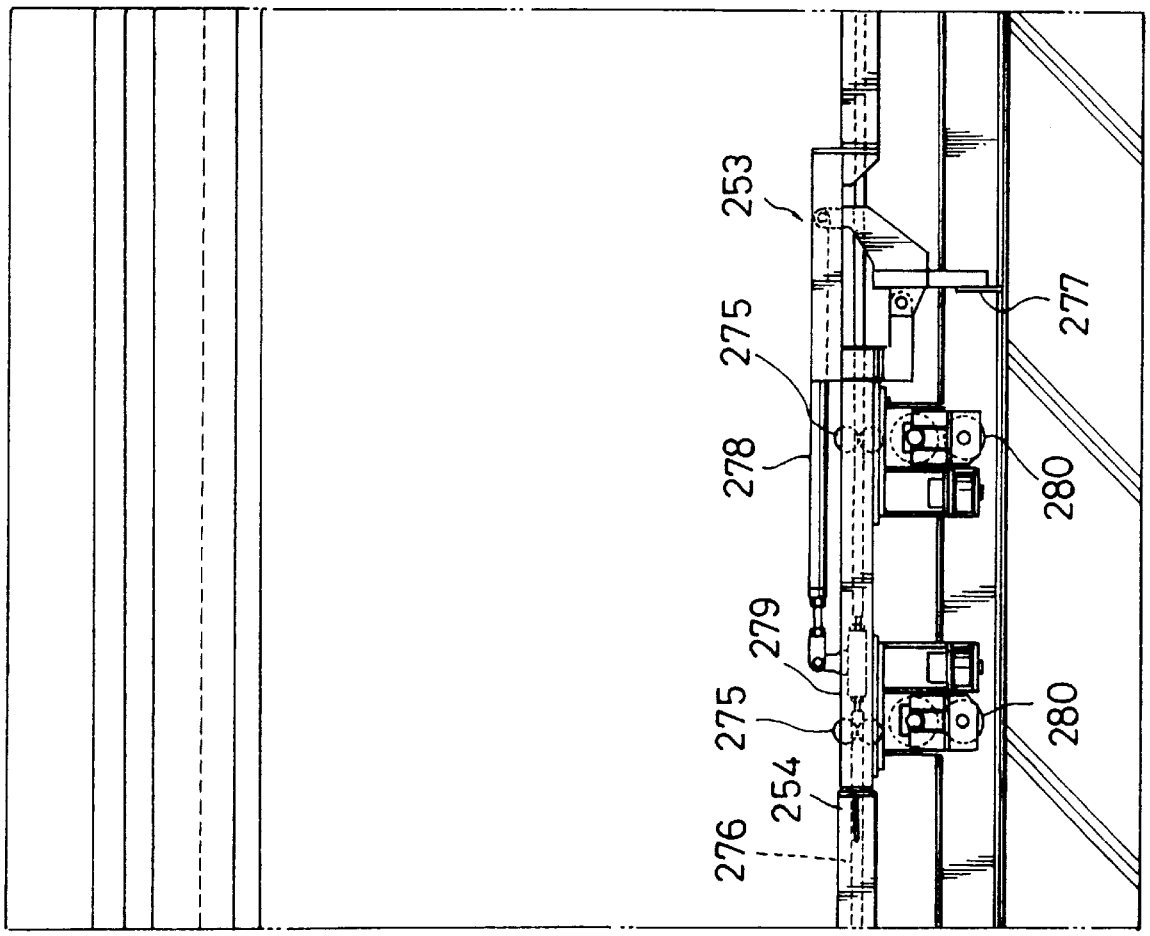
FIG. 8 is an enlarged front view of an intermediate portion of the sludge collecting apparatus of FIG. 4.
Figure 9:
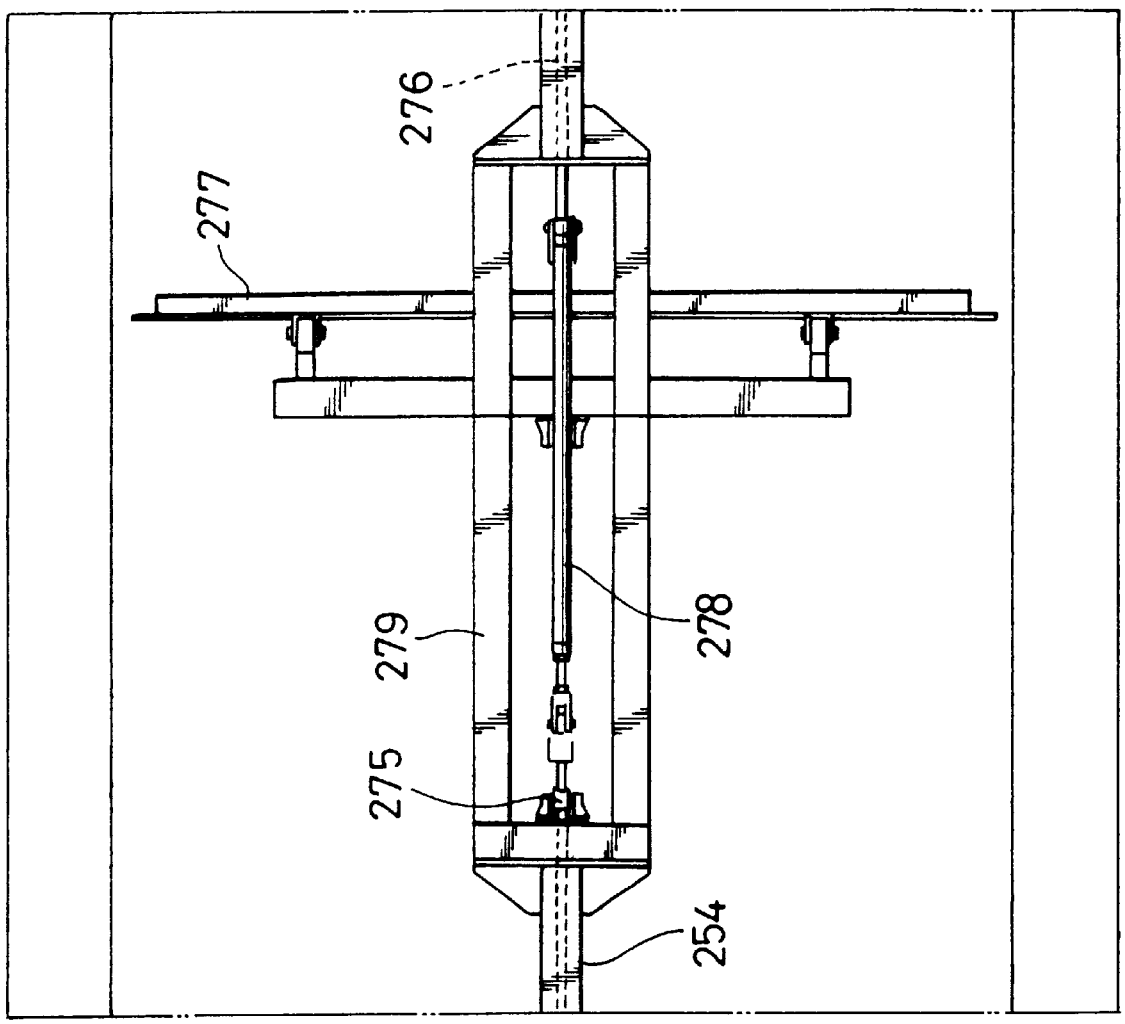
FIG. 9 is an enlarged plan view of the intermediate portion of the sludge collecting apparatus of FIG. 4.

FIGS. 8 and 9 show the detailed structure of the intermediate part 253. The intermediate part 253 has an intermediate body 279 and the intermediate body 279 has rollers (driving wheels) 280 at four positions. A plurality of intermediate parts 253 may be arranged. The rollers 280 can be omitted.

Figure 10:
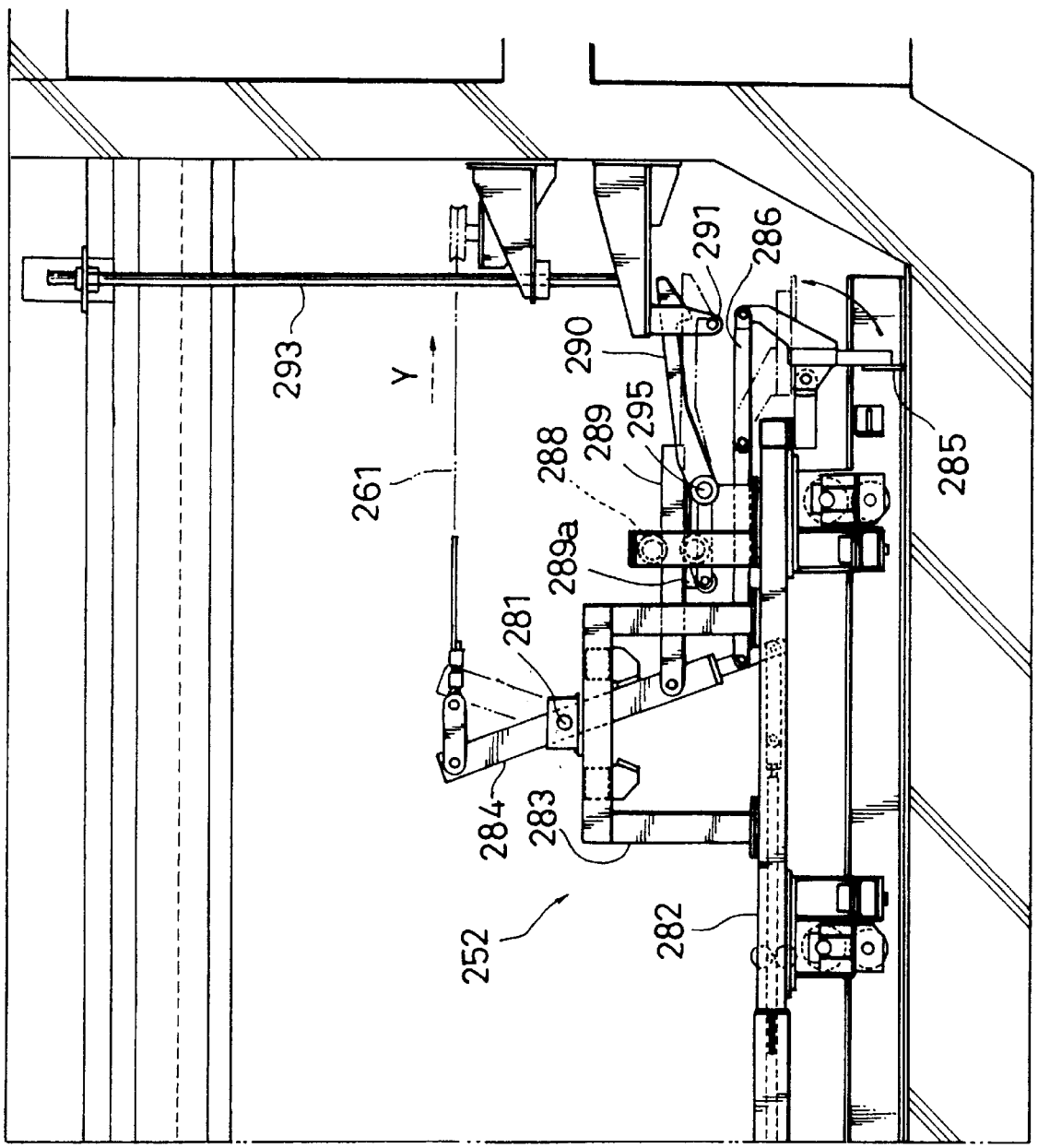
FIG. 10 is an enlarged front view of a rear portion of the sludge collecting apparatus of FIG. 4.
Figure 11:
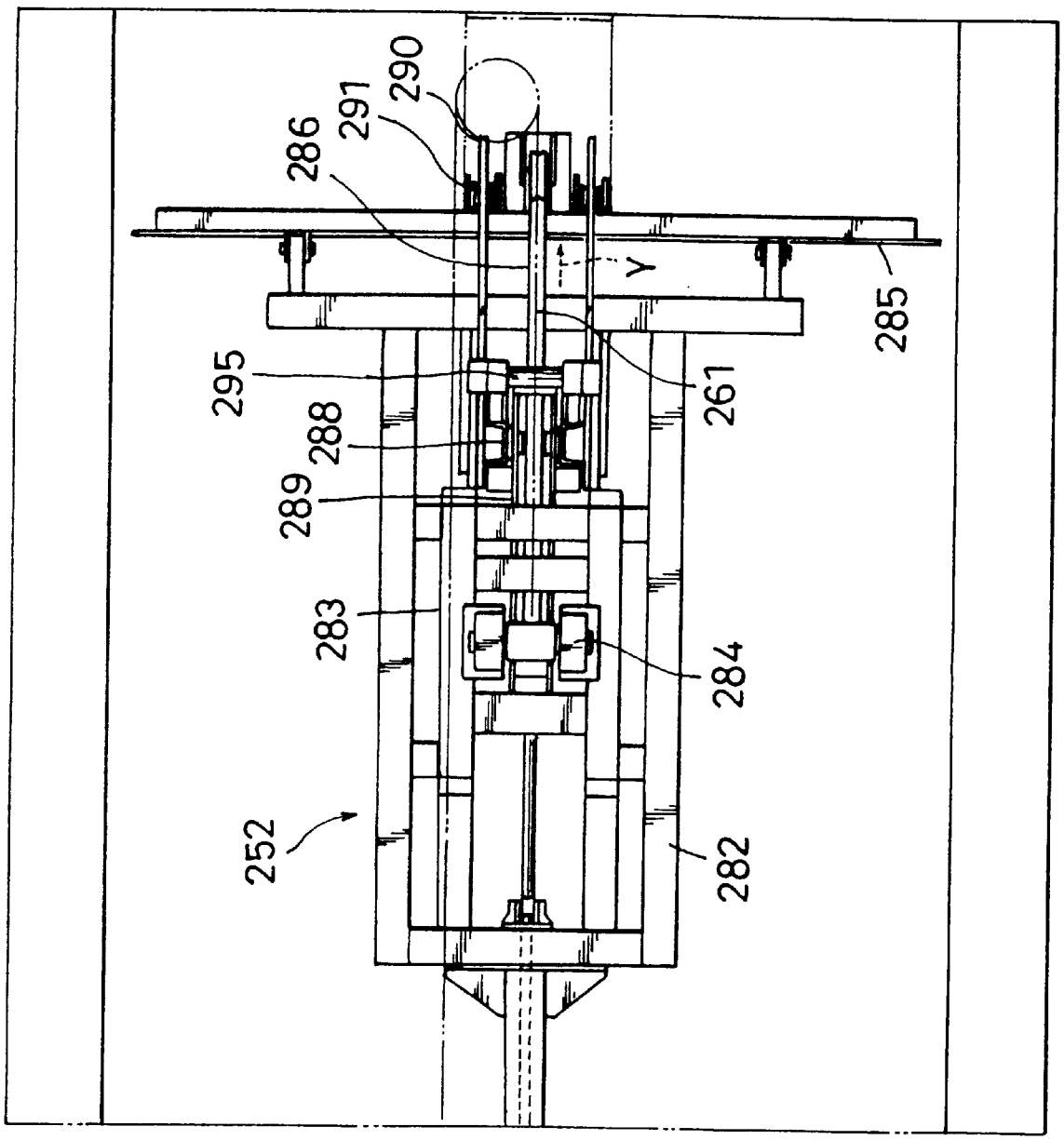
FIG. 11 is an enlarged plan view of the rear portion of the sludge collecting apparatus of FIG. 4.

As shown in FIGS. 10 and 11, the rear part 252 has a rear part body 282. The rear part body 282 is provided with a lever stand 283. On the lever stand 283, a rotary shaft 281 is provided in the width direction of the tank (direction which perpendicularly crosses the advance/retreat directions of the vehicle body). A swing lever 284 is pivotally supported by the rotary shaft 281 so as to be swingable in the travel direction in a state where a middle point of the lever is supported. One end of the wire rope 261 which is pulled to the right side in FIG. 10 is connected to the upper end of the swing lever 284. The interlocking rod 276 is connected to the lower end of the lever 284. Reference numeral 285 denotes the rearmost sludge scraper among the following scrapers. The sludge scraper 285 is movable interlockingly with the swing lever 284 via an interlocking link 286.

Each of the front and rear swing levers 260 and 284 is provided with a presser bar 289 so as to be forward/backward movably guided by rollers 288. A wedge unlocking piece 289a is protruded from the bottom surface of the presser bar 289. The presser bar 289 at the front end will be explained as an example. Since the presser bar 289 is retreated at the time of sludge collection, a temporary lock lever 290 becomes escapable upward. When the advanced sludge scraper 262 at the end of sludge collection comes above the sludge collecting pit, the temporary lock lever 290 engages with a horizontal shaft to be locked (corresponding to the member 291 in FIGS. 4 and 5) on the fixed side. When the apparatus enters the noncollecting state while it is engaged, the wire rope 261 on the left side in FIG. 4 is pulled and the swing lever 260 at the left end in FIG. 4 operates so as to swing the lower part of the lever counterclockwise. The presser member 289 is consequently protruded to the left side in FIG. 4, so that the unlocking piece 289a presses the rear roller of the temporary lock lever 290 and the front end of the temporary lock lever 290 is lifted. Since the lock is held during such a period, the vehicle body does not move to the left in FIG. 4, that is, in the returning direction until the sludge scrapers 262, 277, and 285 are switched to the noncollecting state. The lock and unlocking mechanism at the right end in FIG. 4 operate similarly. Specifically, since the presser bar 289 is pulled in the noncollecting state, the temporary lock lever 290 engages with the locked shaft 291 in the state where it can escape upward. In the engagement state, when the apparatus intends to enter the collecting state, the advancement of the vehicle body is stopped by the engagement for a predetermined time and, after that, the engagement is released and the apparatus enters the collecting state.

By the operation, before entering the collecting or noncollecting state, the front, rear, and intermediate parts 251, 252, and 253 are temporarily locked and the operation of lifting the sludge scrapers 262, 277, and 285 is performed first. As means for temporarily locking the parts, a groove or a projection can be formed in the top face of the guide rail 250 thereby temporarily locking the roller 257 or a groove or a projection may be formed on a side part of the guide rail 250 thereby temporarily locking the roller 257.

Reference numeral 293 denotes rear limit switch operating means. This means is to control forward/reverse rotation of the driving source and is also provided in the front part.

FIG. 4 shows a state where the state is switched to the collecting state and the apparatus is moving forward. The wire rope 261 is pulled in the X direction, the swing lever 260 is inclined forward (to the left), and the most advanced sludge scraper 262 becomes vertical. Interlockingly, the intermediate sludge scraper 277 and the rear sludge scraper 285 become vertical and enter the collecting state via the interlocking rod 276. The scum scraper 265 interlockingly becomes horizontal and enters the noncollecting state. The front presser member 289 moves backward, so that the temporary lock lever 290 becomes free and the vehicle body advances.

The front temporary lock lever 290 automatically engages with the locked shaft at the front end in the travel direction of the apparatus. After that, the wire rope 261 is pulled to the other side (Y direction).

Then, the interlocking rod 276 operates interlockingly with the rear swing lever 284, the front swing lever 260 interlockingly moves, the vehicle body is temporarily locked, the scrapers are lifted first, and then the vehicle body returns. The scum scraper 265 is lifted and operates so as to collect scum to the right direction.

The sludge collecting apparatus retreats while pushing and collecting the scum to the right side by the scum scraper 265 and lifting up the lower scrapers 262, 277, and 285. In this instance, the rear temporary lock lever 290 is free, it automatically engages with the locked shaft 291. When the wire rope 261 works in the direction of the arrow X, the rear swing lever 284 interlockingly moves as shown by the solid line. The presser member 289 consequently locks the temporary lock lever 290 and the lock is unlocked after a predetermined time elapses. An overflow weir 295 is generally provided near the water surface in the treatment tank. Algae and the like are attached to the inner and outer faces of the overflow weir 295. In order to remove the algae, it can be constructed in such a manner that a stay is provided upright from each of the bodies 253 and 252 and cleaning means such as a brush may be provided at the upper end of the stay to clean the faces of the overflow weir 295 in association with the advancing and retreating motion.

(3) The Third Embodiment

The third embodiment is a modification of the embodiment shown in FIG. 4. The detailed structure of the third embodiment is shown in FIGS. 12 to 18.

Figure 12:
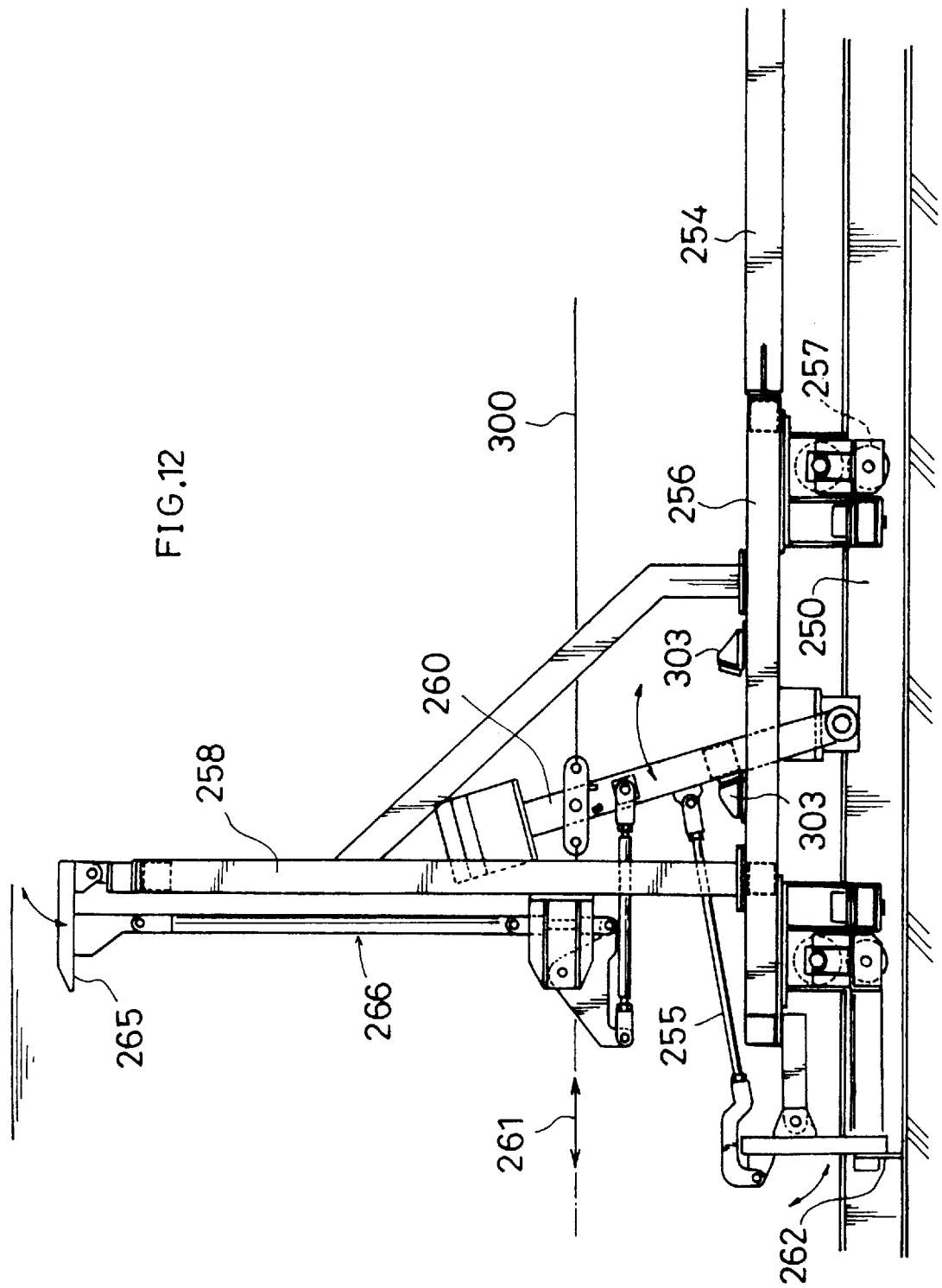
FIG. 12 is an enlarged front view of a front portion of a sludge collecting apparatus according to the third embodiment of the invention.
Figure 15:
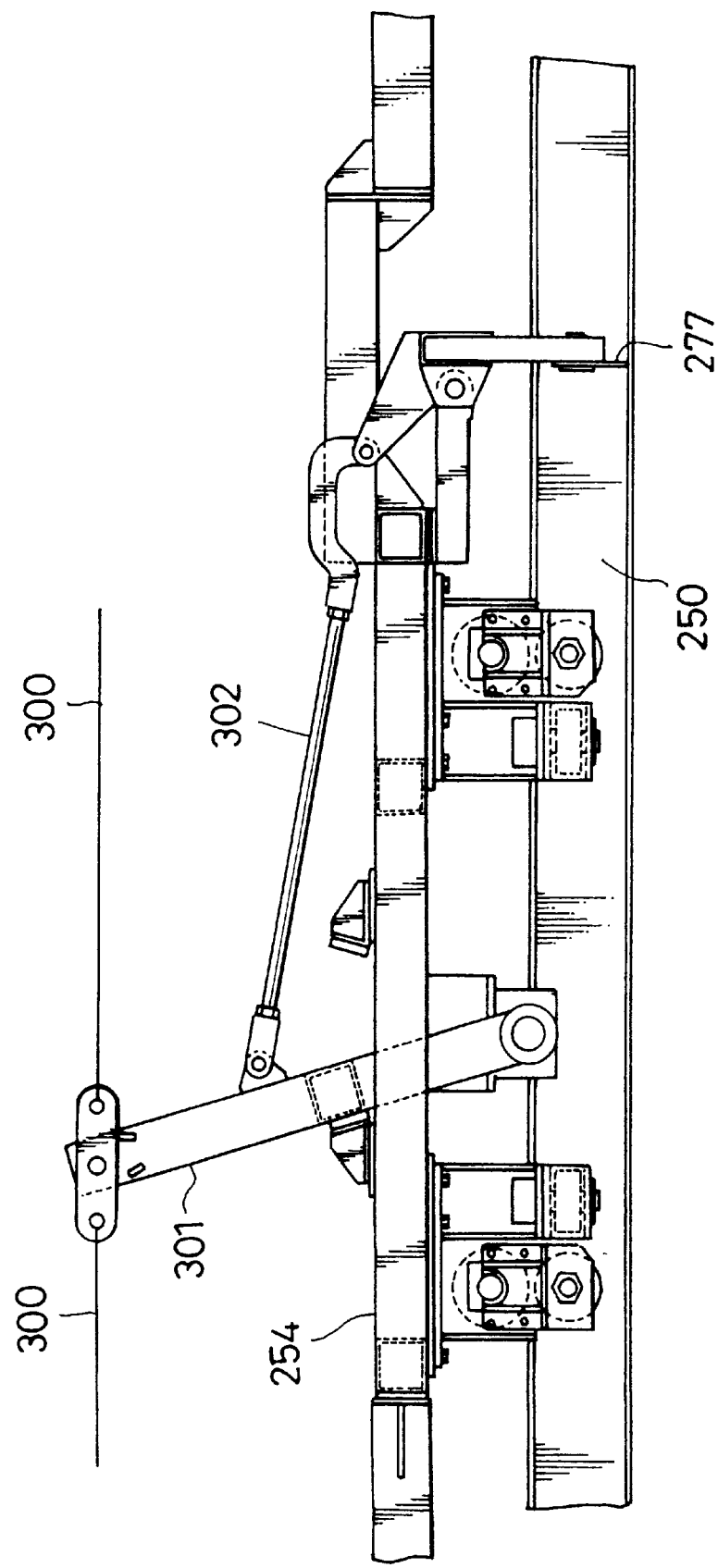
FIG. 15 is an enlarged front view of an intermediate portion of the sludge collecting apparatus of FIG. 12.
Figure 17:
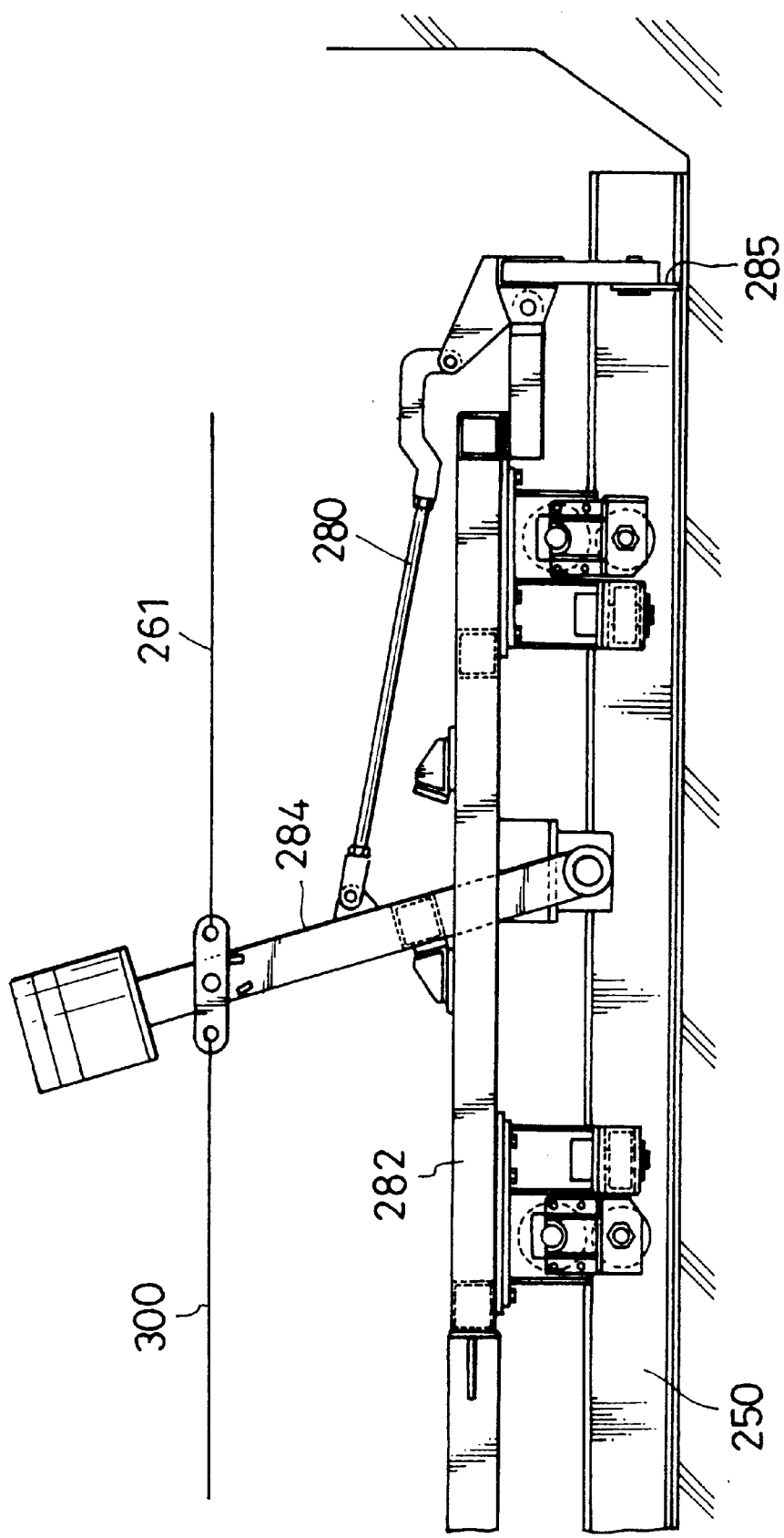
FIG. 17 is an enlarged front view of a rear portion of the sludge collecting apparatus of FIG. 12.

As illustrated in FIGS. 12, 15, and 17, although the member for connecting the front and rear swing levers 260 and 284 is the rod in the foregoing embodiment, a wire rope 300 is used in the third embodiment. As shown in FIG. 15, an intermediate swing lever 301 is provided and the intermediate swing lever 301 and the intermediate sludge scraper 277 can be interlockingly connected via an interlocking link 302. Above them, the front swing lever 260 and the intermediate swing lever 301, and the intermediate swing lever 301 and the rear swing lever 284 are connected via the wire rope 300.

The levers 260 . . . of the embodiment may be rotatably supported directly by the body of the vehicle body 256. A lever stopper 303 is similarly provided.

Figure 13:
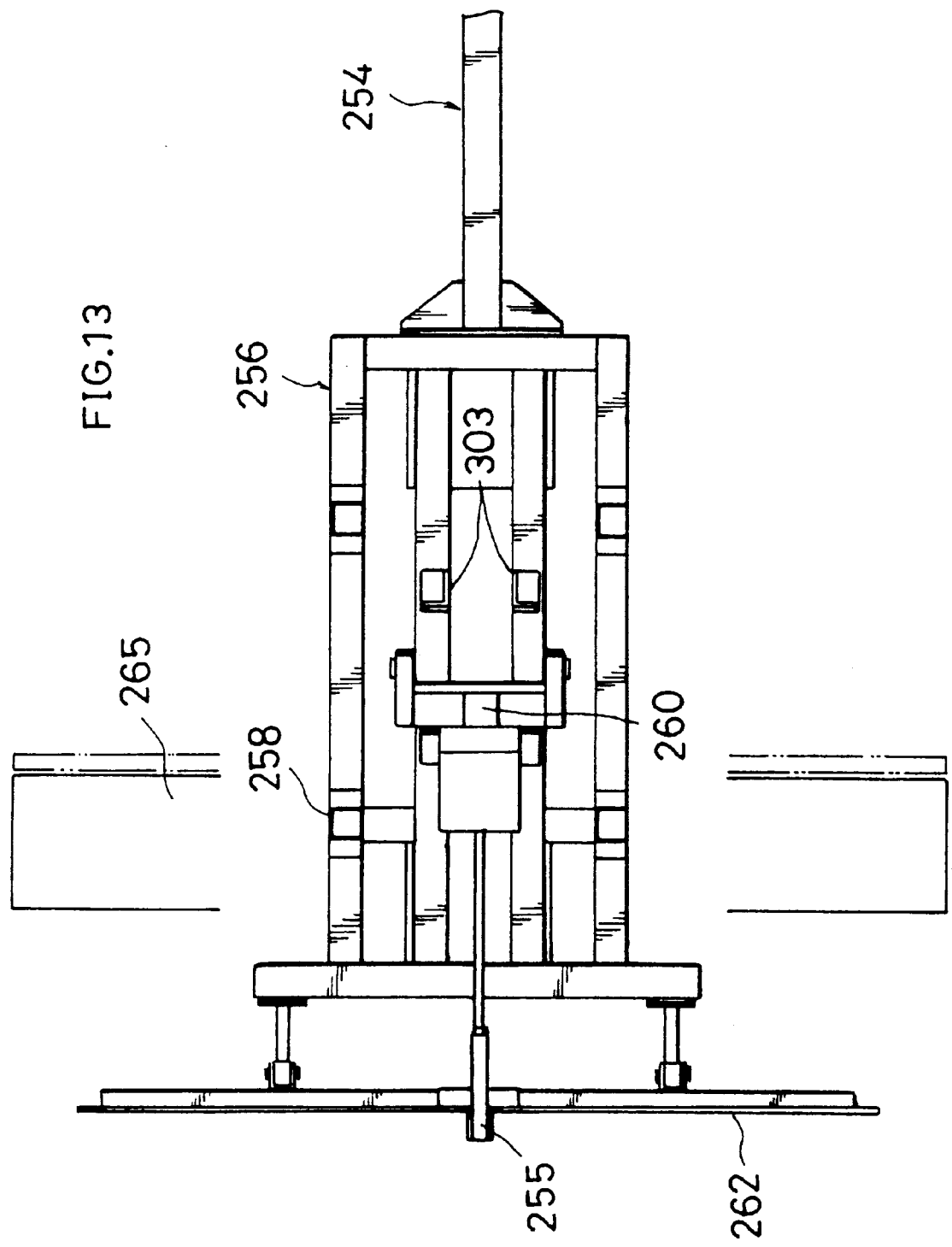
FIG. 13 is an enlarged plan view of the front portion of the sludge collecting apparatus of FIG. 12.
Figure 14:
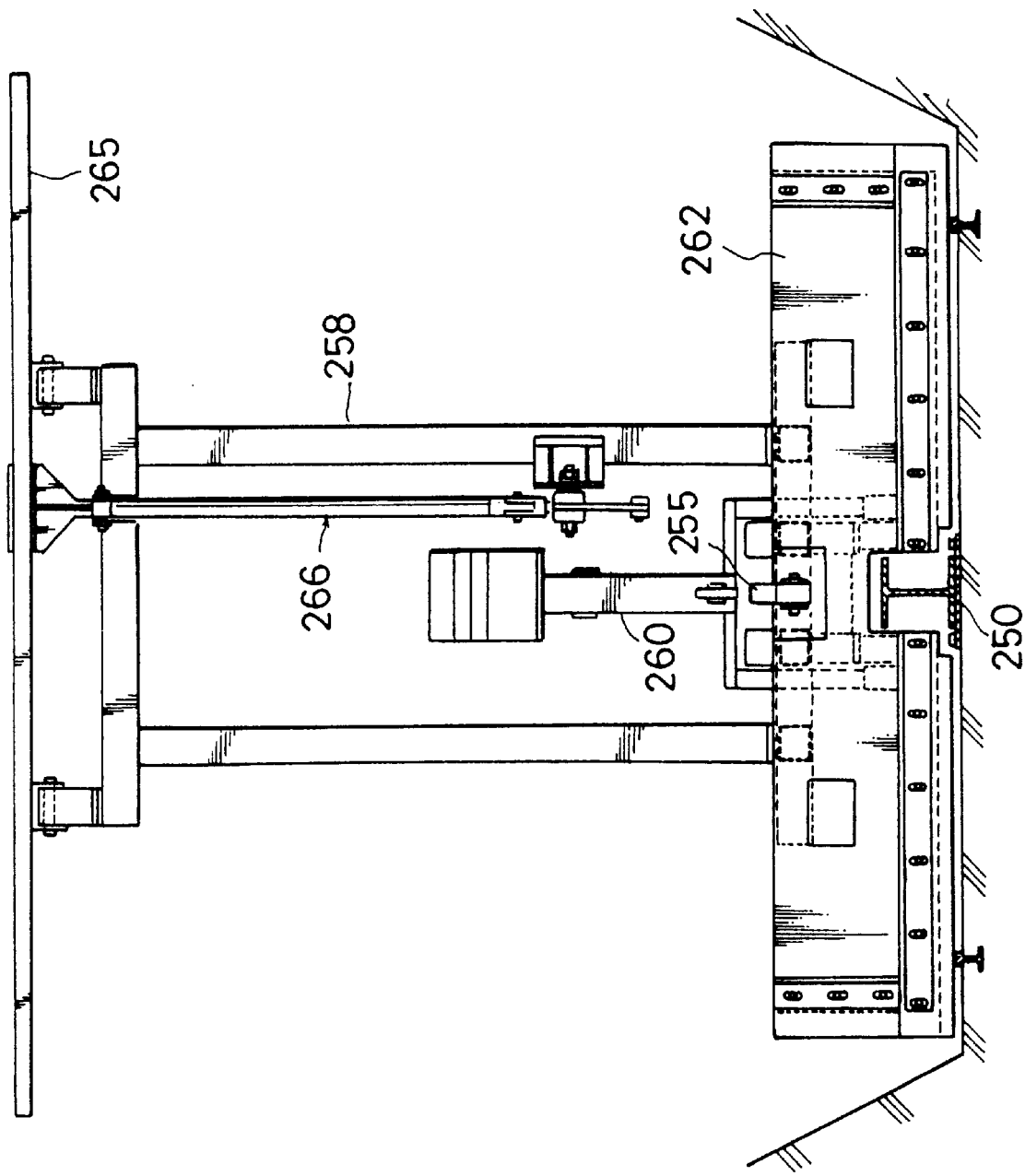
FIG. 14 is an enlarged side view of the sludge collecting apparatus of FIG. 12 disposed in a treatment tank.
Figure 16:
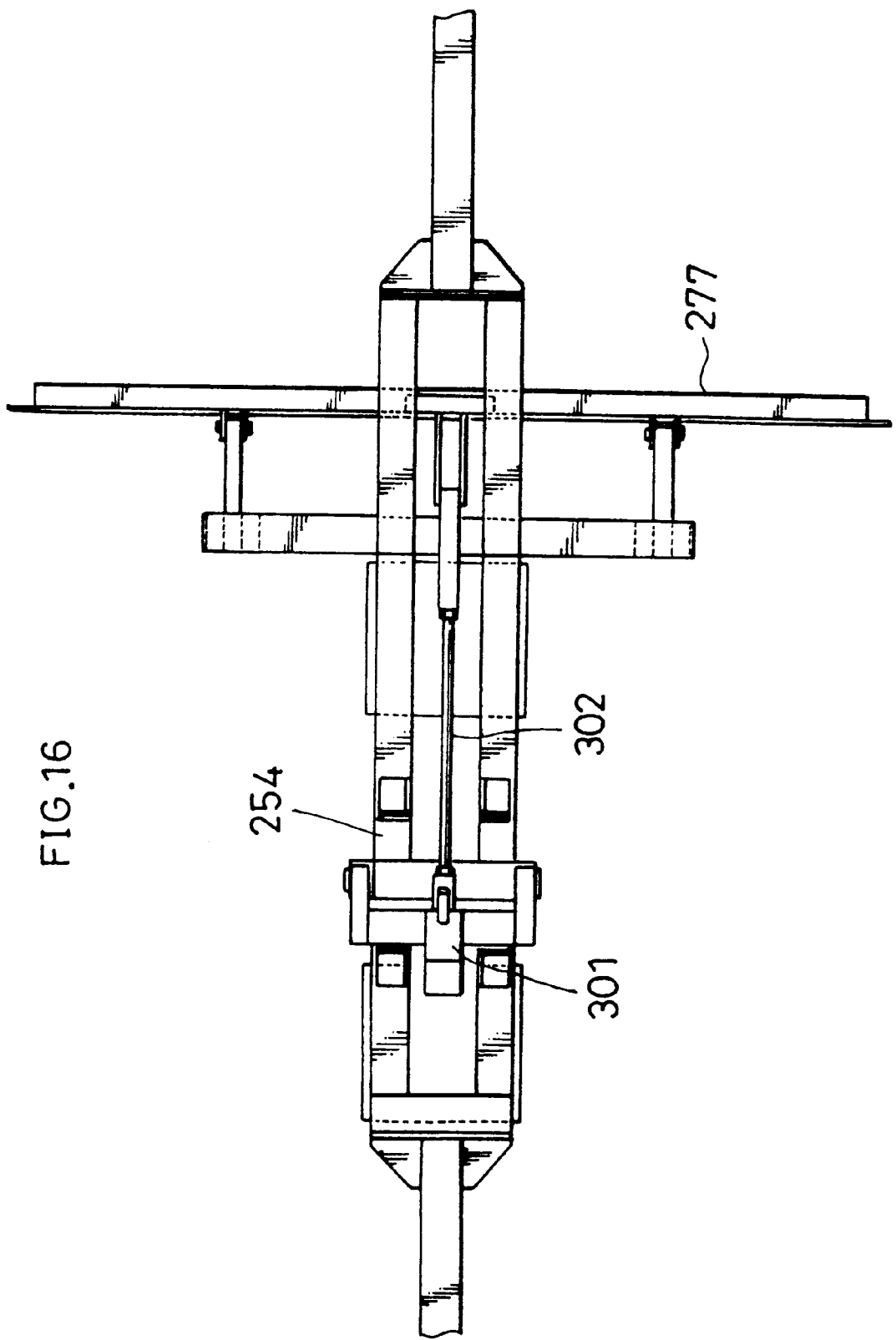
FIG. 16 is an enlarged plan view of the intermediate portion of the sludge collecting apparatus of FIG. 12.
Figure 18:
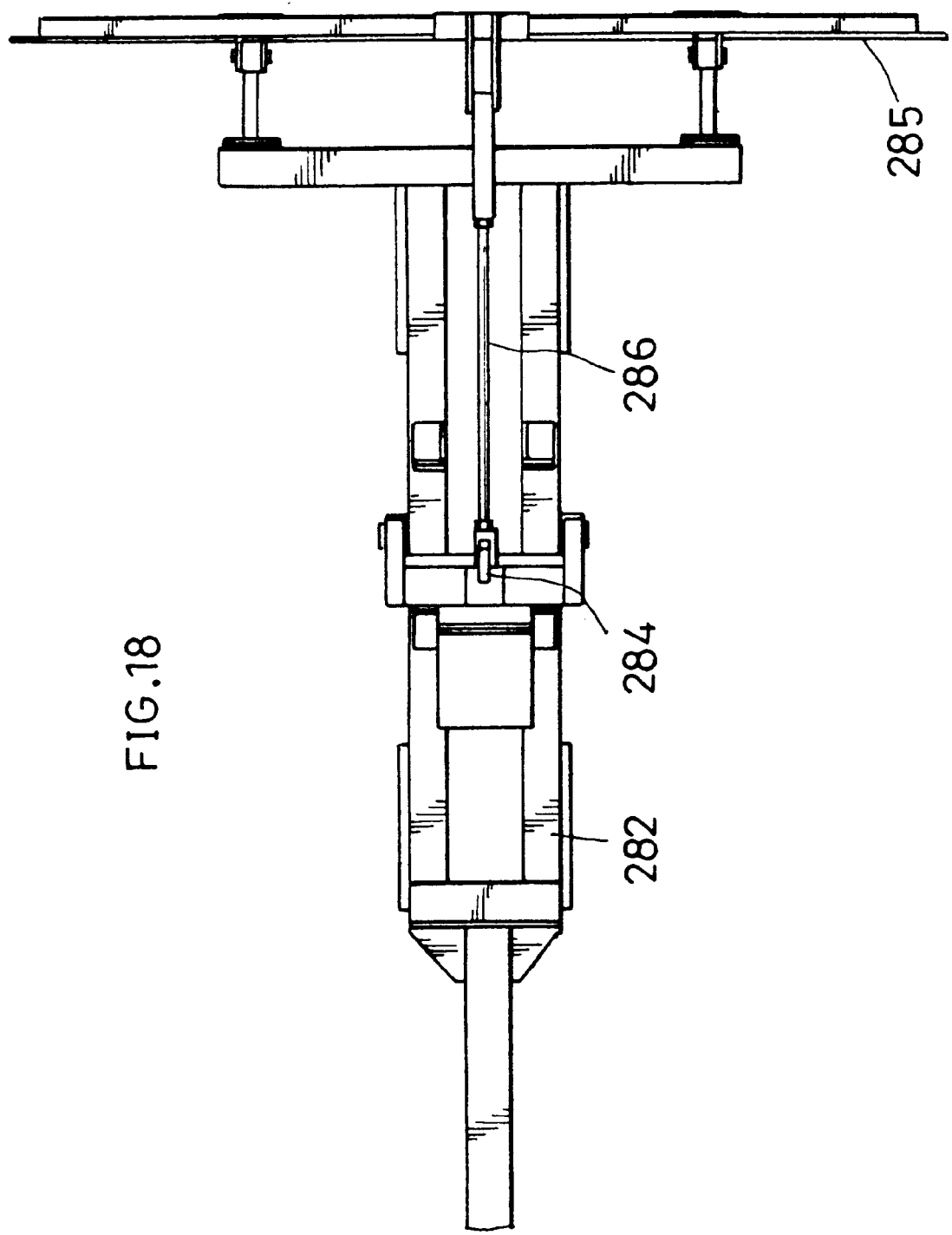
FIG. 18 is an enlarged plan view of the rear portion of the sludge collecting apparatus of FIG. 12.

FIG. 13 shows the structure in plan view of the sludge collecting apparatus of FIG. 12. FIG. 14 shows the structure in side view of the apparatus. FIG. 16 illustrates the structure in plan view of the apparatus of FIG. 15. FIG. 18 illustrates the structure in plan view of the apparatus of FIG. 17.

(4) The Fourth Embodiment

Figure 19:
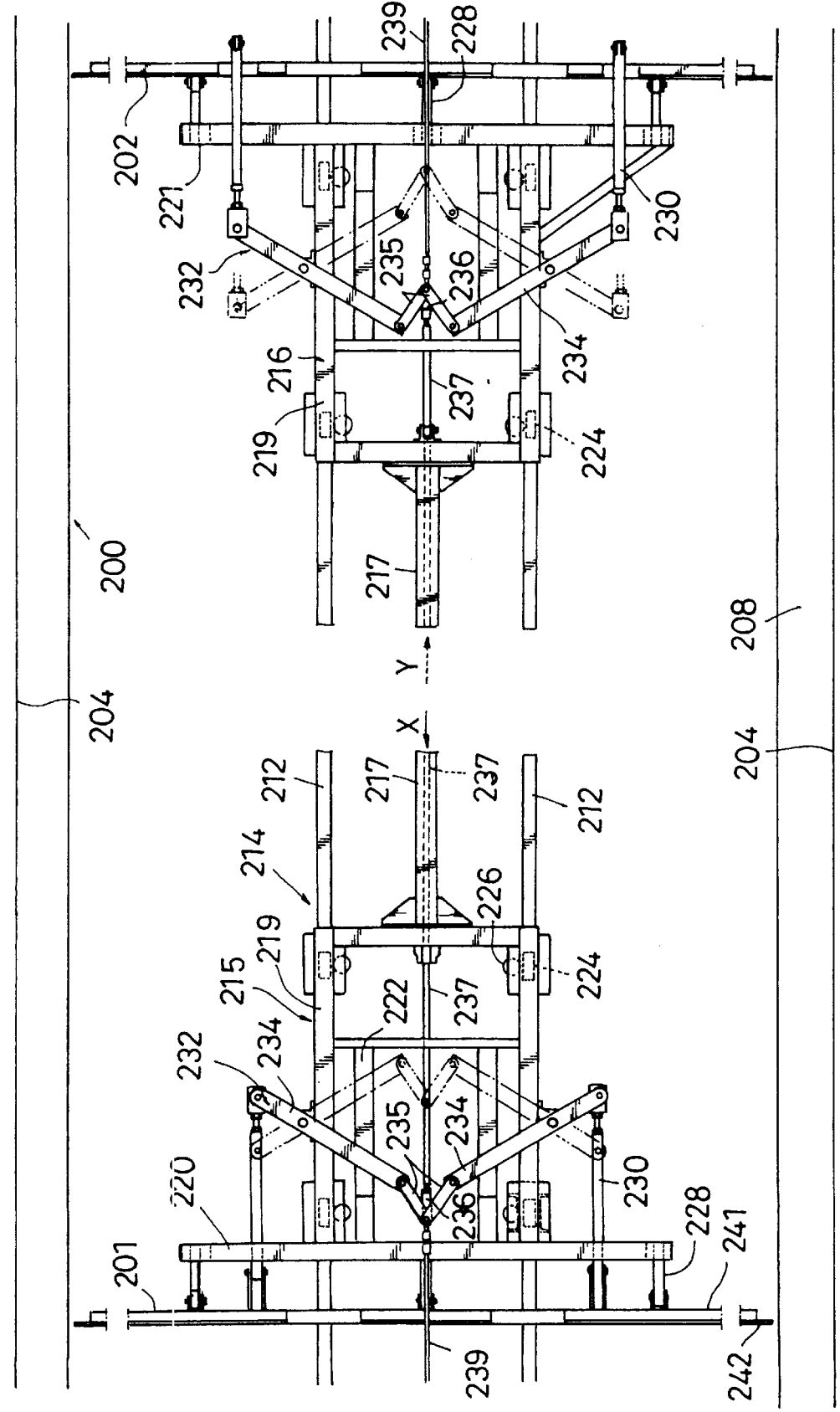
FIG. 19 is a plan view of a sludge collecting apparatus according to the fourth embodiment of the invention.
Figure 21:
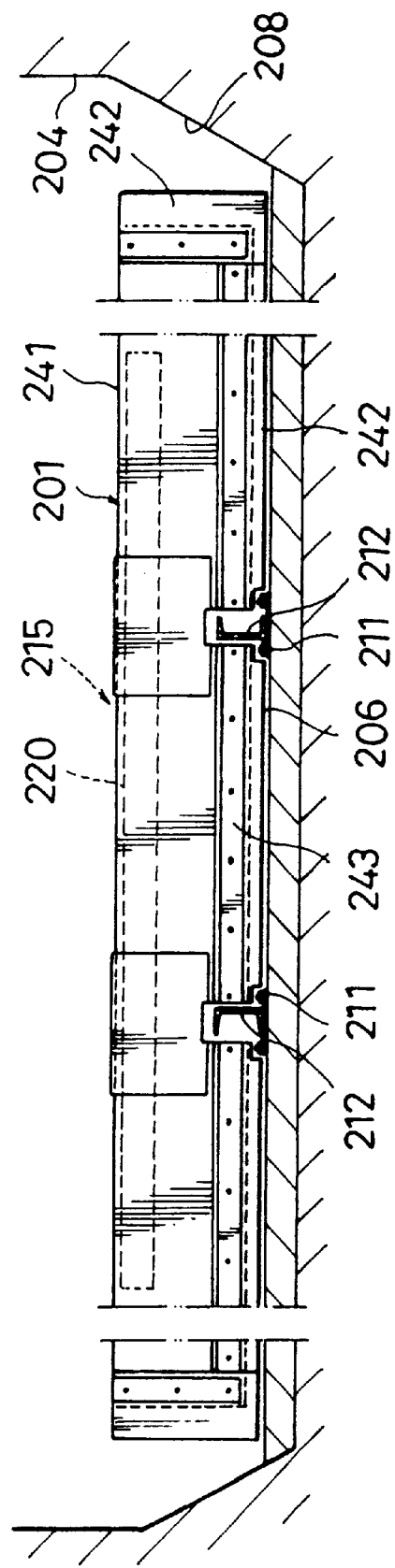
FIG. 21 is a side view of the sludge collecting apparatus of FIG. 19 disposed in a treatment chamber.

A sludge collecting apparatus of the fourth embodiment is shown in FIGS. 19 to 21. The sludge collecting apparatus of the embodiment is driven to move forward and backward in the longitudinal direction in a sedimentation tank 200 and in particular has two sludge scrapers 201 and 202 which are positioned largely apart from each other in the travel direction. In the sludge scrapers, the advanced sludge scraper 201 on the left side in FIGS. 19 and 20 is switched between a collecting state (advance state) where the sludge scraper 201 is vertical and a noncollecting state (retreat and return state)

where it is lifted forward. The right-side following sludge scraper 202 is switched between the collecting state where it is vertical and the noncollecting state where it is lifted rearward. The vehicle body 214 has a much simpler structure. Moreover, the sludge scrapers 201 and 202 can move interlockingly by a link mechanism which operates in a very low posture.

The sedimentation tank 200 comprises a pair of right and left side walls 204, 204 shown in FIG. 19, end walls (longitudinal walls) 205, 205 facing each other at an interval of approximately ten to twenty meters shown in FIG. 20, and a bottom surface 206 which is gradually inclined by several degrees from the end wall (longitudinal wall which is not illustrated) on the rear side to the other end wall (not shown). A recessed sludge collecting pit having sludge removing means (not shown) such as a pump is formed at the end of the inclined bottom 206 which is lowered to the left.

As illustrated in FIG. 21, the intersecting part of the side wall 204 and the bottom 206 is a side inclined wall 208. The intersecting part between the end wall 205 on the rear side and the bottom 206 is a rear inclined wall 209. Sewage flows in from the upper left side of FIGS. 19 and 20.

A pair of right and left existing guide rails (not shown) which extend in the longitudinal direction of the tank are laid on the bottom 206 at a wide interval so as to coincide with the positions of flight shoes. A pair of newly laid right and left guide rails 212, 212 each having a board 211 are arranged on the inner sides of the existing guide rails and are fixed by attaching the board 211 to the bottom 206.

The guide rails 212 of almost C-shaped channel members are laid so that the grooves face to the opposite directions. The guide rails 212 are fixed to the board 211 by welding. The guide rails 212 may be detachably attached to the board 211. The guide rails 212 may be fixed directly to the bottom 206 without using the board 211.

The sludge collecting apparatus has a long-type vehicle body 214. The vehicle body 214 has a front body 215 and a rear body 216 which are connected by coupling the front and rear ends by pipe type connecting member 217 (or pin-joint connecting method such as vertical shafts) so as to realize a simple frame construction as a whole.

The front and rear bodies 215 and 216 are formed as an integral frame having front and rear frames 220 and 221 at the ends of a frame member 219 having an almost C shape in plan view as shown in FIG. 19 and stiffeners 222 are properly provided.

Each of the front and rear bodies 215 and 216 comprises driving rollers 224 which roll on the guide rails 212, derail preventing rollers 225 for preventing upward derail from the guide rails 212, and side rollers 226 for assuring the driving along the guide rails 212 and can travel forward and backward. Although the rollers are arranged in four positions each in the front and rear parts, for example, they can be arranged in two positions each in the front and rear parts.

From the front and rear bodies 215 and 216, a plurality of brackets 228 . . . are horizontally projected on the right and left sides. A front scraper 201 and a rear scraper 202 are pivotally supported via the brackets 228. The scrapers 201 and 202 can be switched between the vertical collecting state and the horizontal noncollecting state (return state) by a pair of right and left operating rods 230 which operate lower than the vehicle body 214.

As a mechanism for operating the operating rods 230, a link mechanism 232 is provided in each of the front and rear parts. The link mechanism 232 is comprised of a pair of main links 234 which are supported by bearings 233 provided vertical axially on the sides of the vehicle body 214 so as to be swingable in the horizontal direction and a pair of auxiliary links 235 connected to the inner ends of the main links 234. The outer end of the main link 234 is connected to one end of the operating rod 230 and the inner end is connected to one end of the auxiliary link 235 for track control. The auxiliary links 235 have ends adjusted to lie in the same plane and are pin connected to ajoint 236 to position the assembly in the center of the vehicle body.

The joint 236 is provided for each of the front and rear bodies 215 and 216. An interlocking rod (or interlocking material such as wire rope) 237 is connected between the joints 236, 236. The interlocking rod 237 travels forward and backward through the connecting member 217 while being guided by upper and lower rollers 238. Wire ropes 239, 239 are connected to the front and rear joints 236. Although the interlocking rods 237 passes through the connecting member 217, it can extend outside the connecting member 217. The number of connecting member(s) 217 may be single as shown in the diagram or plural.

As shown in FIG. 21, in the front sludge scraper 201 (the rear side is similar), a scraper body 241 of a rubber plate is attached to the lower part and right and left sides of the scraper body 241. The scraper bodies 242 are pressed by movable presser bars 243.

As shown by imaginary lines in FIG. 20, guide rollers 245 which roll on the existing guide rails and enable stable driving may be provided at the lower ends of the scrapers 201 and 202.

By opening a long hole in the main link 234, there is a case that the auxiliary link 235 is not provided. Further, an elevating scraper with the body may be provided between the front and rear parts of the apparatus. The scrapers are not limited to two or three or further, many as a whole.

FIG. 19 shows the structure in plan view of the sludge collecting apparatus of the embodiment disposed in the sedimentation tank 200. The front sludge scraper 201 travels to the left end so as to be above the pit as shown by the arrow and the rear sludge scraper 202 advances in the collecting mode to the front further than the front sludge scraper 201 which is waiting. By the operation, sludge is dropped into the pit and removed. The operation is performed by pulling the wire rope 239 in the X direction in FIGS. 19 and 20. After that, the wire rope 239 is pulled to the other Y direction. The front and rear link mechanisms 232 therefore operate interlockingly via the interlocking rod 237 as shown by imaginary lines. The front and rear scrapers 201 and 202 are lifted as shown in FIG. 20 and enter the noncollecting state (return state). The wire 239 is pulled by a drum provided coaxially with the driving source (not shown) provided above the tank. When the wire 239 is pulled to either the right or left side in FIG. 19, the other end is fed from the drum.

(5) The Fifth Embodiment

Figure 22:
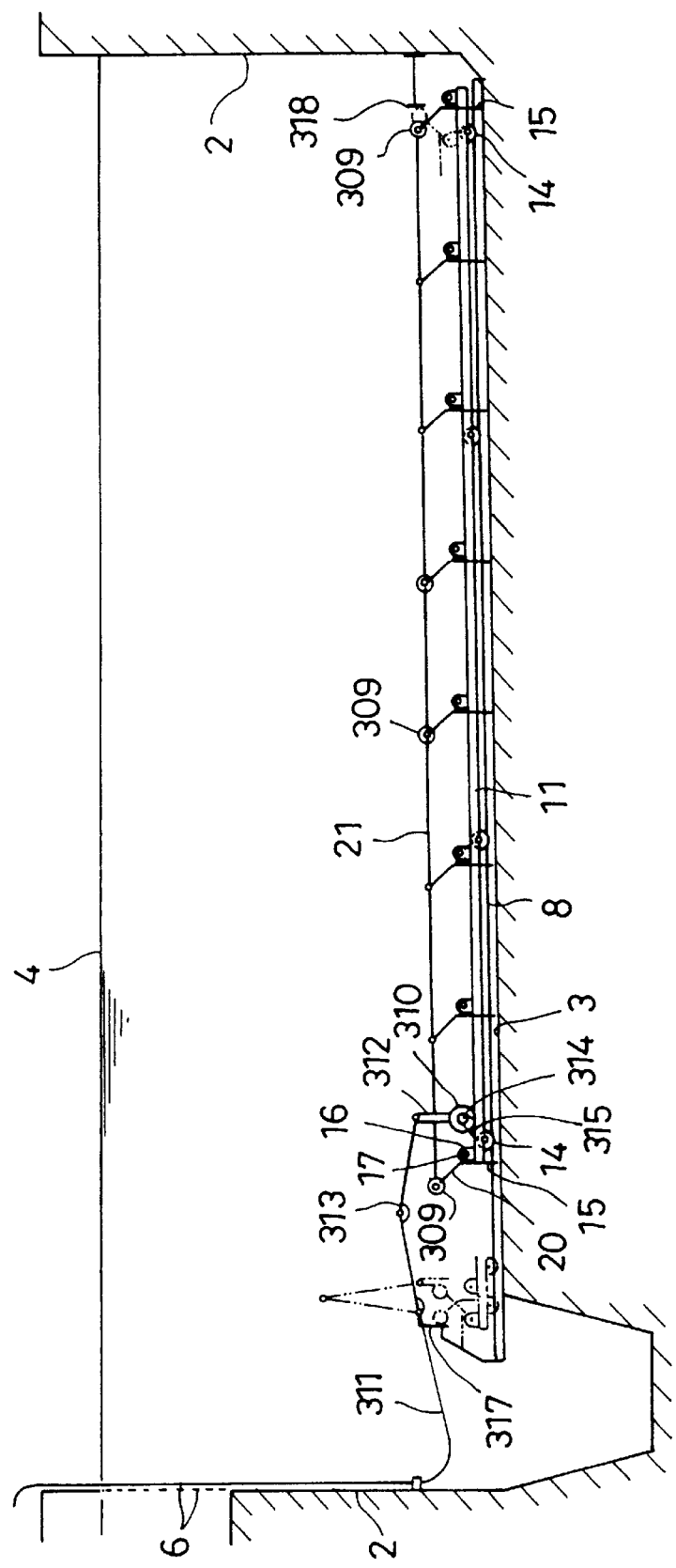
FIG. 22 is a front view of a sludge collecting apparatus according to the fifth embodiment of the invention disposed in a treatment chamber.

FIG. 22 shows the fifth embodiment. In the embodiment, the same components as those of the first embodiment shown in FIG. 1 are designated by the same reference numerals and the other components are designated by new reference numerals. In the embodiment, as driving means 310 for moving the vehicle body 11 forward and backward, means consisting of a submergible motor and a speed reducer is used. The driving means 310 is mounted on the front end of the vehicle body 11.

The output shaft of the driving means 310 is directed in the width direction of the tank which perpendicularly crosses the longitudinal direction of the vehicle body 11. A control board (not shown) is mounted outside the tank so that the rotation can be switched between advance and retreat at the front and rear ends of the vehicle body 11. The driving means 310 is driven from a distributing board via a cable 311 having therein a plurality of current-carrying codes. In order to certainly pass a current, a hermetically sealed pipe 312 is vertically formed on the driving means 310 and the cable 311 is led via an extendable cable support 313 to the hermetically sealed pipe 312 so as not to be slackened.

A driving sprocket 314 is attached to the output shaft of the driving means 310 and a sprocket on the driving wheel 14 side at the front end is driven via a chain (such as a timing belt) 315 by the driving sprocket 304. In association with it, the driving wheels 14 rotate. The driving means 310 is switched between forward rotation and reverse rotation at the time point the vehicle body 11 advances to the left end of FIG. 22 and the time point the vehicle body 11 retreats to the right end of FIG. 22. In the embodiment, the sludge scrapers 15 . . . are not switched by the driving means 310. The interlocking lever 20 comes into contact with a front stopper 317 protruded from the front end of the guide rail 8 and a rear stopper 318 projected from the rear end wall 2, thereby switching all of the sludge scrapers 15 . . . between the collecting state and the noncollecting state via the interlocking link 21. The sludge scraper 15 is switched when a weight 319 properly attached to the interlocking lever 20 is switched between the front and the rear with respect to the scraper shaft 17 as a border.

The operation of the apparatus of FIG. 22 will be described. The solid lines in the diagram show a state where the sludge scrapers 15 . . . are switched from a horizontal noncollecting state (state shown by imaginary lines) to a vertical collecting state (advancing state). Since the weight of the sludge scraper 15, the interlocking lever 20, the weights 319 . . . , the interlocking link 21, and the like is applied by using the scraper shaft 17 as a fulcrum, each of the sludge scrapers 15 is turned counterclockwise in the FIG. 22. In this case, since the most advanced sludge scraper 15 is stopped by coming into contact with the front surface of the vehicle body 11, the collecting state shown in the diagram is maintained. When the other sludge scrapers 15 . . . are stopped by stoppers (not shown), the load is shared.

By the rotation of the driving means 310, the driving wheels 14 as front wheels are driven. The vehicle body 11 advances at a creep speed and sludge as deposit on the bottom is collected by the sludge scrapers 15 . . . to the left side in the diagram. The stroke is similar to that in FIG. 1 and is larger than an interval between the neighboring sludge scrapers 15. Each of the following sludge scrapers 15 . . . pushes sludge to the forward further than the return position of each of the advancing sludge scrapers 15 . . . . The most advanced sludge scraper 15 collects and drops the sludge collected by the behind sludge scraper 15 into the pit 5.

When the vehicle body 11 travels to a position just before the advance end as shown by imaginary lines, the weight 319 at the front end comes into contact with the front stopper 317. Consequently, all of the sludge scrapers 15 . . . are inclined rearward via the interlocking link 21 and the interlocking levers 20 . . . . Each of the sludge scrapers 15 . . . is stopped in a horizontal state by the weight of the weight 319, the interlocking link 21, and the interlocking lever 20. In this case, the stopper is constructed. The state is sensed by sensing means (not shown) and the driving means 310 is reversely rotated.

All of the sludge scrapers 15 . . . retreat while they remain horizontal. At the end part, the weight 319 at the rear end comes into contact with the rear stopper 318 and the sludge scrapers 15 return to the vertical collecting state. The above is a series of operations.

Although the posture of the sludge scrapers 15 . . . is switched by the stoppers 317 and 318 in the embodiment, the posture of the sludge scrapers 15 may be switched interlockingly with the driving means 310. In this case, another driving means 310 for switching the posture may be additionally provided. It can be also constructed in such a manner that the driving means 310 is used for switching the posture of the sludge scraper 15 and the vehicle body 11 is driven forward and backward by a wire rope or the like.

(6) The Sixth Embodiment

Figure 23:
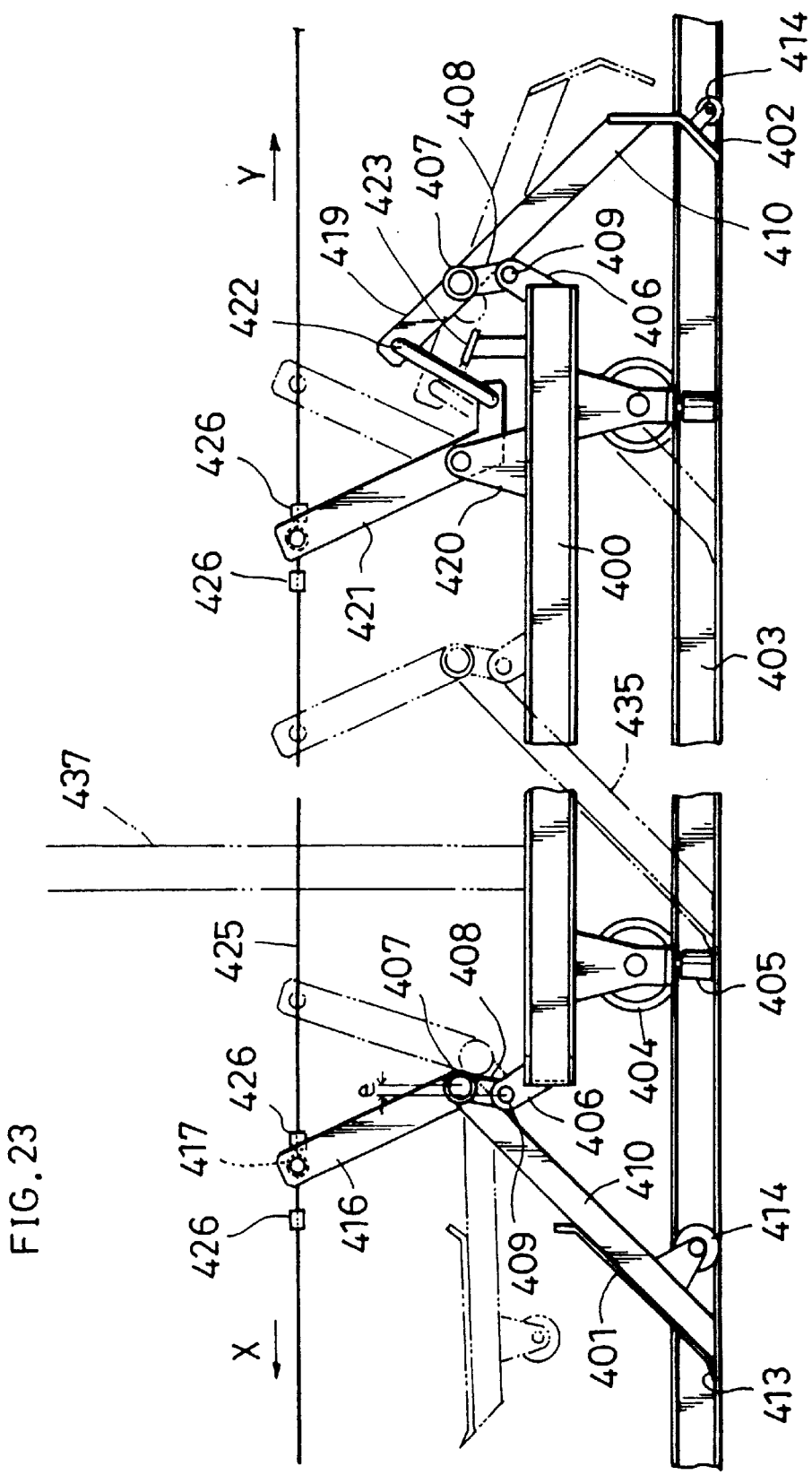
FIG. 23 is an enlarged front view of a front portion of a sludge collecting apparatus according to the sixth embodiment of the invention.
Figure 24:
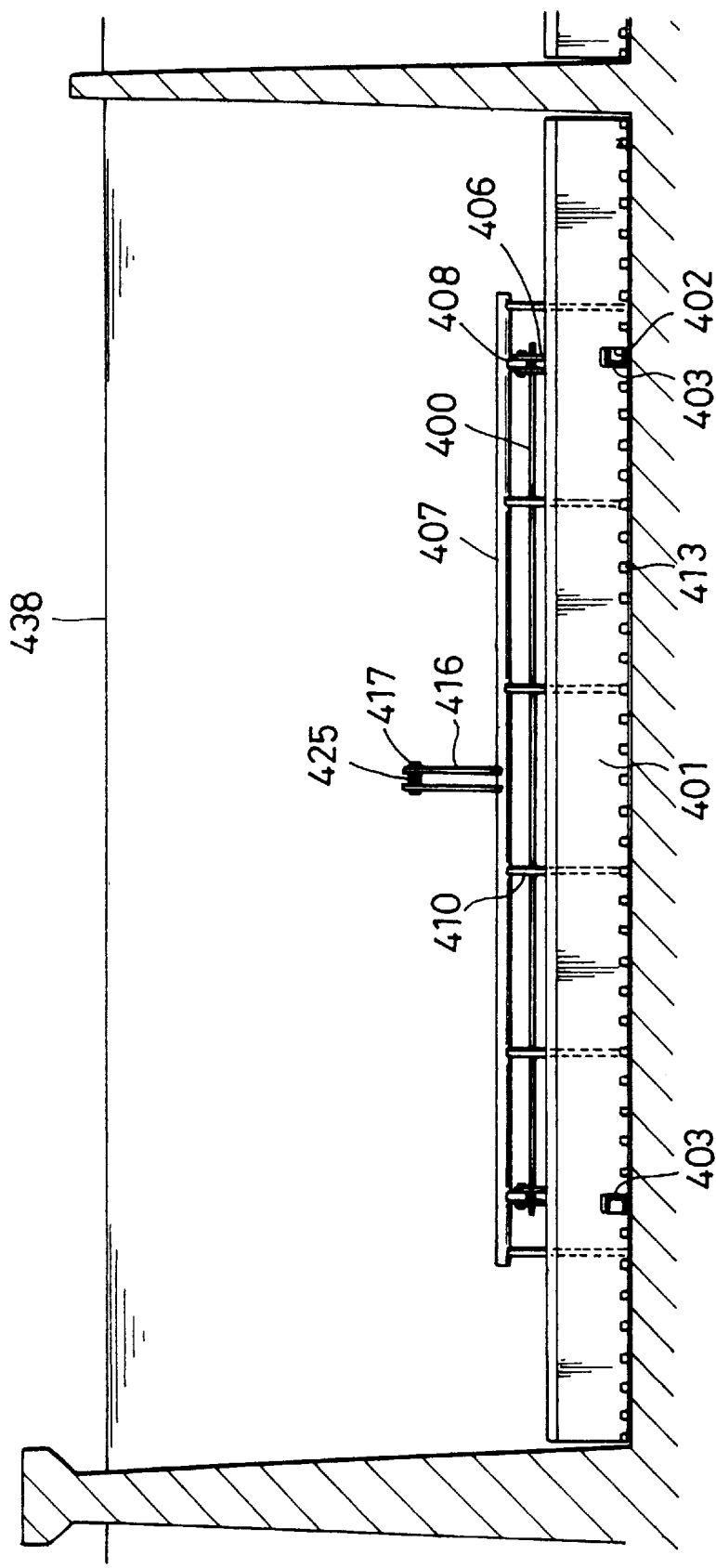
FIG. 24 is an enlarged side view of the sludge collecting apparatus of FIG. 23 disposed in a treatment tank.
Figure 25:
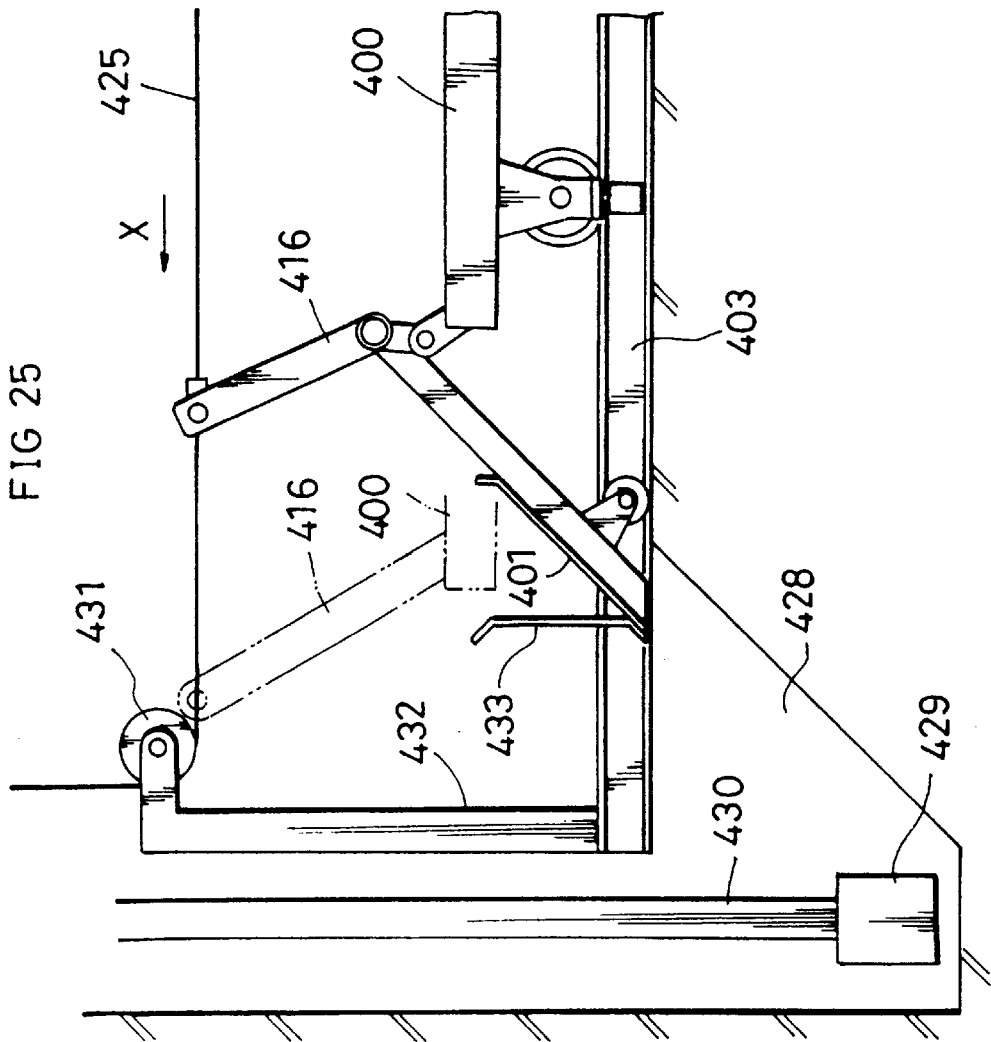
FIG. 25 is an enlarged front view of the main part of the sludge collecting apparatus of FIG. 23.

The sixth embodiment is shown in FIGS. 23 to 25. In the embodiment, a sludge collecting apparatus having a long-type vehicle body 400 in the longitudinal direction intended to be used in a sedimentation tank having the length of approximately 10 m and the width of approximately 11 m. FIG. 23 is a side view of the sludge collecting apparatus. The solid lines show the collecting state and the imaginary lines show the noncollecting state (return state).

Although the vehicle body 400 has the length of about 10 m for the length of 100 m of the sedimentation tank, the vehicle body 400 can have a length longer than that, for example, 30 to 50 m. Although two sludge scrapers 401 and 402 are attached to the front and rear parts of the vehicle body 400, one sludge scraper as shown in FIG. 23 or a plurality of sludge scrapers may be attached between the sludge scrapers 401 and 402.

A pair of guide rails 403 are disposed on the bottom at a wide interval as shown in FIG. 24 and two pairs of front and rear driving wheels 404 . . . equipped for the vehicle body 400 can rotate along the guide rails 403. Reference numeral 405 in FIG. 23 denotes a side roller which prevents side run-out and derail of the apparatus to the above while being fit in the groove in the guide rail 403.

At the front and rear ends of the vehicle body 400, as shown in FIG. 24, stationary brackets 406 are fixed so as to face each other in positions which are apart in the lateral direction. To the stationary brackets 406, movable brackets 408 attached to both right and left ends of a laterally-long pipe 407 are rotatably connected by shafts 409. A plurality of bolsters 410 . . . which are inclined downward (about 45 degrees) in the collecting state extend from the lateral pipe 407 so as to be apart from each other in the lateral direction as shown in FIG. 24. On the front surface of each of the bolsters 410, as illustrated in FIG. 23, the front sludge scraper 401 which is also inclined downward is attached. The lifting angle of the front sludge scraper 401 to the horizontal surface is 60, 45, or 30 degrees. It can be smaller than 30 degrees or larger than 60 degrees.

In the collecting state, the center of the lateral pipe 407 is deviated from the center of the shaft 409 as illustrated by (e) in FIG. 23. Consequently, the center of gravity of the lateral pipe 407 easily moves backward, so that the posture can be easily changed from the collection state where the weight tends to be heavy due to the weight of the front sludge scraper 401 to the noncollecting state.

At the lower end of the front sludge scraper 401, notches 412 are formed to avoid interference with the guide rails 403 and a number of nails 413 are detachably attached along the lower end of the scraper 401.

In the lower part of the back surface of the front sludge scraper 401, a proper number of, such as a pair of right and left gauge wheels 414 are disposed so that the scraper 401 does not interfere with the bottom of the tank.

On the other hand, in the center of the lateral pipe 407, a front interlocking lever 416 is provided upright. The lever 416 is comprised of a pair of right and left boards and a rotary piece 417 is provided between the boards.

The rear sludge scraper 402 is attached to the lower part of the bolster 410 which extends downward from the lateral pipe 407. The front of the lower end of the rear sludge scraper 402 is inclined downward (the rear is inclined upward). The gauge wheel 414 may be also attached to the rear face of the rear sludge scraper 402.

On the rear lateral pipe 407, a receiving lever 419 is provided upright and a rear interlocking lever 421 which is rotatably supported by a stationary bracket 420 fixed to the vehicle body 400 is attached. The rear interlocking lever 421 and the receiving lever 419 are connected via an interlocking link 422. As shown by imaginary lines in FIG. 23, a similar mechanism as that on the front sludge scraper 401 side may be provided on the rear side as well. Reference numeral 423 denotes a stopper.

Each of the front and rear sludge scrapers 401 and 402 is switched between the collecting state shown by the solid lines in FIG. 23 and the noncollecting state shown by the imaginary lines by a wire rope 425 which is linearly moved forward and backward by the driving source and a sheave outside the tank. Specifically, the wire rope 425 is passed through front and rear pieces 417 and the switching operation is performed by a pair of front and rear contact pieces 426 . . . fixed to the wire rope 425.

When the wire rope 425 is pulled in the direction of the arrow X in FIG. 23, the contact piece 426 on the back of the front interlocking lever 416 pushes the lever 416 in the X direction. By the operation, the lever 416 enters the collecting state shown by the solid lines in FIG. 23. The rear interlocking lever 421 is allowed to enter the collecting state by the contact piece 426 on the back side. Simultaneously, the vehicle body 400 advances. Since each of the scrapers 401 and 402 has a surface whose rear part is inclined upward, even if the sludge is hardened to a certain extent, the sludge is scooped up with a lighter force and the vehicle body advances while receiving the sludge at the sloped surface and newly collecting sludge. Since the power necessary for the driving can be small and the resistance to the scraper surface is low, damage is reduced.

FIG. 25 shows a state where the front sludge scraper 401 comes above a pit 428 at the end in the travel direction of the sedimentation tank. The pit 428 has a pump 429 or a suction port and a suction pipe 430 is provided so as to communicate with the pump 429. From the projecting part above the pit 428 of the guide rail 403, a stay 432 for a sheave 431 is provided upright. An apparatus of a type having a vertical face scraper 433 on the front surface of the vehicle body 400 is shown by imaginary lines. In this case, when the front interlocking lever 416 is just before a switch as shown in the diagram, a state where the front interlocking lever 416 interferes with the sheave 431 or has no dimensional allowance may be caused. On the contrary, when the front sludge scraper 401 extends so that its front is inclined downward as in the embodiment, even if the front sludge scraper 401 comes above the pit, the interlocking lever 416 remains behind the sheave 431, so that the embodiment is advantageous in many respects.

As shown by imaginary lines in FIG. 23, in the case of using the long vehicle body 400, one or a plurality of scrapers 435 are arranged between the front and rear scrapers 401 and 402, thereby enabling the sludge collecting apparatus as described from FIG. 1 to be constructed. That is, an apparatus of a type having a number of scrapers and whose advance/retreat stroke is small can be constructed. When the wire rope 425 is pulled in the direction of the arrow Y in FIG. 23, the rear contact piece 426 comes into contact with the rear interlocking lever 421 and, after that, the front contact piece 426 comes into contact with the front interlocking lever 416. By the operation, as shown by imaginary lines in FIG. 23, the rear and front sludge scrapers 402 and 401 are lifted and enter the noncollecting state (return state).

Figure 26:
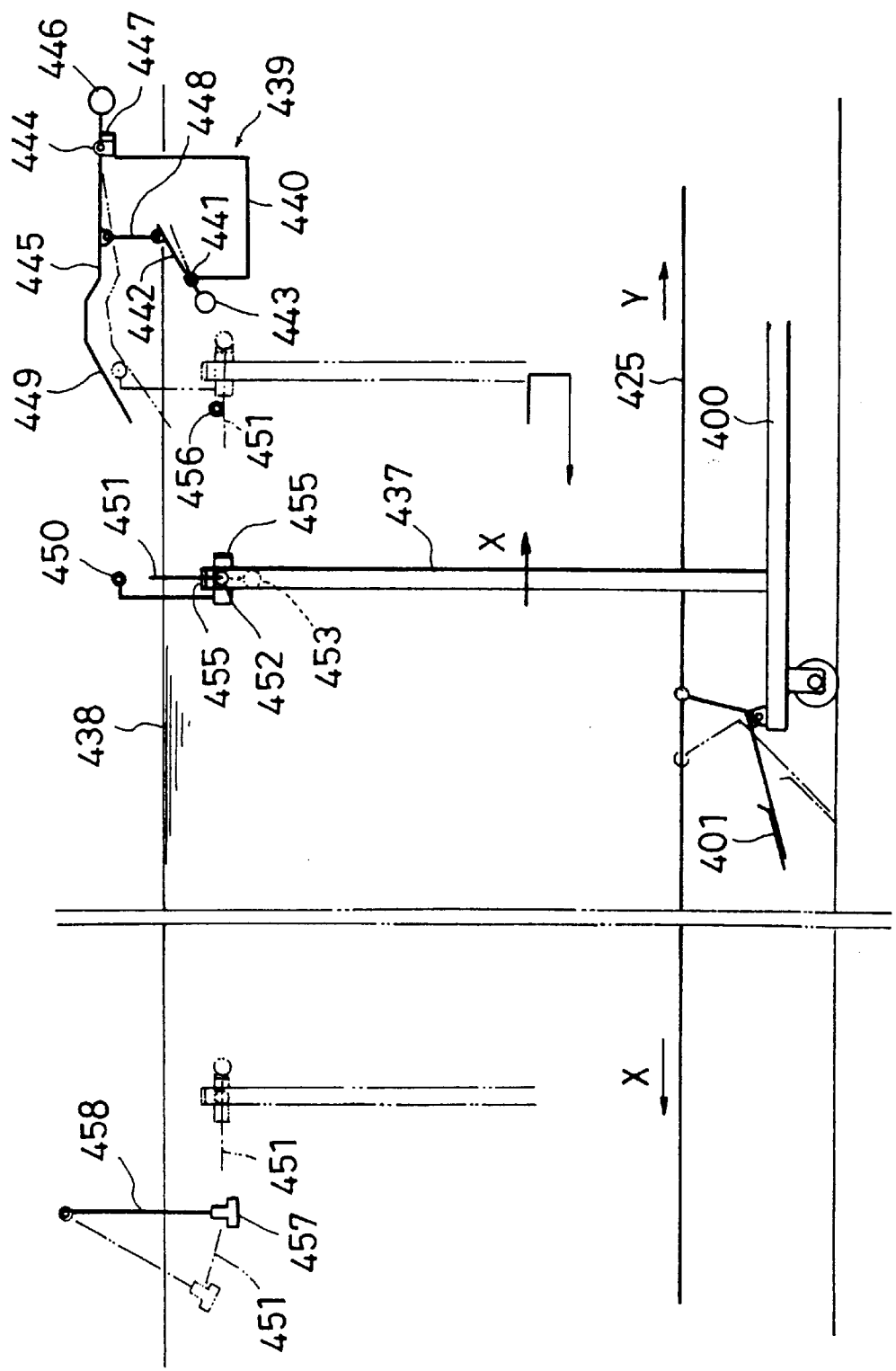
FIG. 26 is an enlarged front view of a scum collecting part of the sludge collecting apparatus of FIG. 23.

On the vehicle body 400, a stay 437 is formed upright. The stay 437 is, for example, comprised of a pair of right and left stays formed upright from both ends of the vehicle body 400 in FIG. 24. It may be a stay (one or two) formed upright in the center of the width of the vehicle body 400. A scum collecting apparatus as shown in FIG. 26 is attached to the stay 437.

The scum collecting apparatus is lifted as shown by the solid lines to collect scum floating on the water surface 438 toward a scum removing apparatus 439 when the sludge collecting apparatus is returned in the Y direction. When the collection of the scum and swallowing of the scum by the scum removing apparatus 439 are finished, the scum collecting apparatus becomes horizontal as shown by the imaginary lines and is returned in the X direction while submerging under the water surface 438.

The scum removing apparatus 439 has a fixed trough 440 of a shield shape with its longitudinal direction being in the width direction of the tank. The front part of the fixed trough 440 is under the water surface. A weir 442 which can be swung by a rotary shaft 441 and is directed obliquely upward in the trough 440 is attached to the front part of the trough 440. The weir 442 has a weir weight 443. A bracket 444 is attached to the rear upper part of the trough 440. An interlocking arm 445 is attached via the bracket 444. The arm 445 is lifted by an arm weight 446 and is held in the horizontal state shown by the solid line by a stopper 447. The interlocking arm 445 and the weir 442 are coupled via a coupling rod 448.

The front end of the interlocking arm 445 serves as a forward tilted cam 449. The cam 449 is finally suppressed by being pressed by a roller 450 provided on the stay 437 side, so that the weir 442 is pressed via the coupling rod 448 and the weir 442 comes below the water surface so as to swallow scum.

A band-plate shaped scum scraper 451 which is formed as long as the width of the tank is swingably attached to the stay 437 side via a scraper shaft 452. A hollow scum scraper 451 can be used instead. A scraper weight 453 is attached to the scraper 451 to make the scraper 451 upright. The weight 453 may not be attached.

A spring stopper 455 is attached watertightly to the stay 437 so as to be positioned around the scraper shaft 452. The spring stopper 455 has therein a ball which is fit in a recess formed in a part of the scraper shaft 452 and a spring for pressing the ball from the back of the ball. Since the ball is disposed at a phase of 90 degrees, the scum scraper 451 can be temporarily locked in the vertical state of the solid line and the horizontal state of the imaginary line. The scum scraper 451 has to have a notch so as not to interfere with the upper spring stopper 455.

When the scum scraper 451 travels while collecting scum as shown by the solid line, the scum scraper 451 comes into contact with a cam roller 456 fixed in front of the scum removing apparatus 439 and is tilted. The scum scraper 451 is held horizontally by the spring stopper 455. After that, the scum scraper 451 is returned in the X direction while being horizontal so that scum is not collected. An engagement piece 457 and a rod (chain rope or the like) 458 which swing while retaining the scum scraper 451 and guide the scum scraper 451 vertically are constructed above the pit side of the sedimentation tank. After the scum scraper 451 becomes vertical, it is held by the spring stopper 455.

[Other Embodiments]

Figure 27:
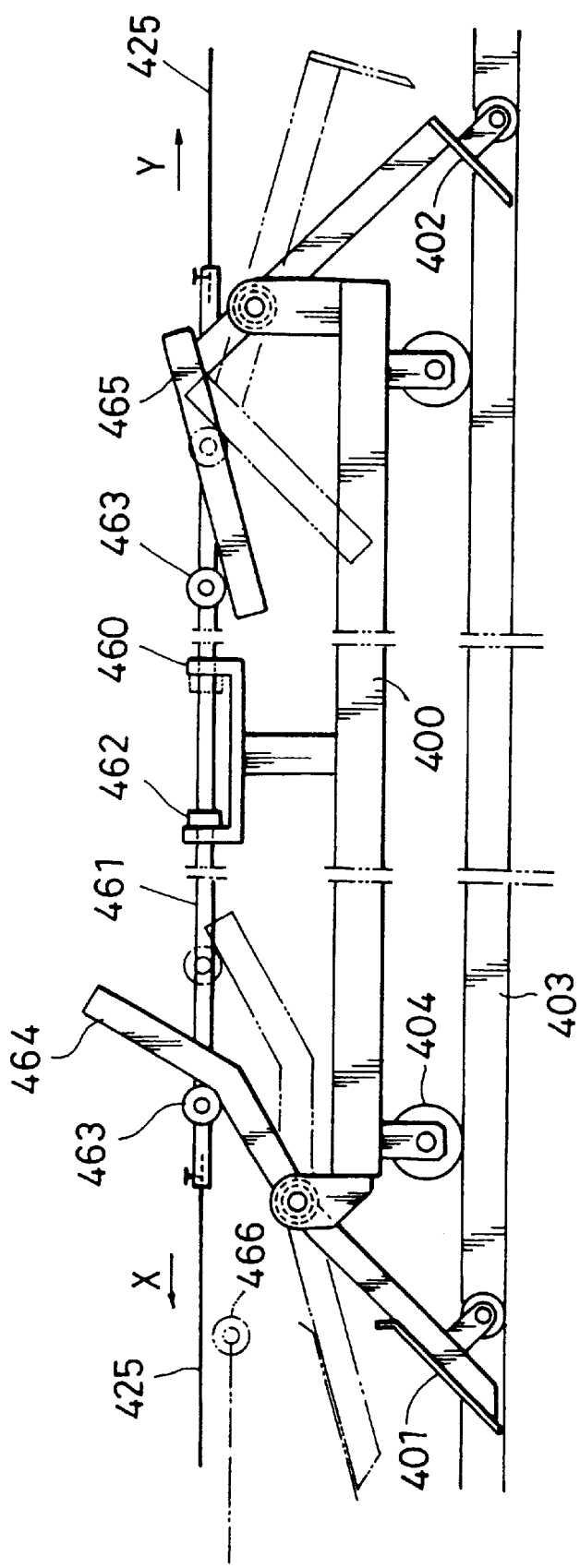
FIG. 27 is an enlarged front view of the main part of a sludge collecting apparatus of another embodiment.

According to an embodiment shown in FIG. 27, the vehicle body 400 has a U-shaped accompanying receiving member 460 and an angular shift shaft 461 provided between the wire ropes 425 is inserted through an angular hole guide of the accompanying receiving member 460. When the wire rope 425 is pulled in the X direction, an accompanying member 462 fixed to the shift shaft 461 comes into contact with the advance side of the accompanying receiving member 460 to move the vehicle body 400 in the X direction. On the other hand, when the wire rope 425 is pulled in the Y direction, the vehicle body 400 is moved in the Y direction. Presser rollers 463 are arranged in the travel direction on the shift shaft 461. When the rollers 463 are moved in the Y direction, front and rear interlocking levers 464 and 465 are pressed down and the front and rear sludge scrapers 401 and 402 enter the noncollecting state. When the presser rollers 463 are moved in the X direction by the wire rope 425, the front and rear scrapers 401 and 402 enter the collecting state by the weight of the scrapers.

The shift shaft 461 is an angular shaft of square, hexagon, or the like and may be a pipe having buoyancy. When the structure in which the shift shaft 461 does not rotate around the shaft center is employed, a round shaft or a round pipe may be used. On the other hand, in place of the interlocking system using the shift shaft 461, the presser rollers 463, and the like, the scraper may be swung by rollers 466 fixed to the tank walls.

Figure 28:
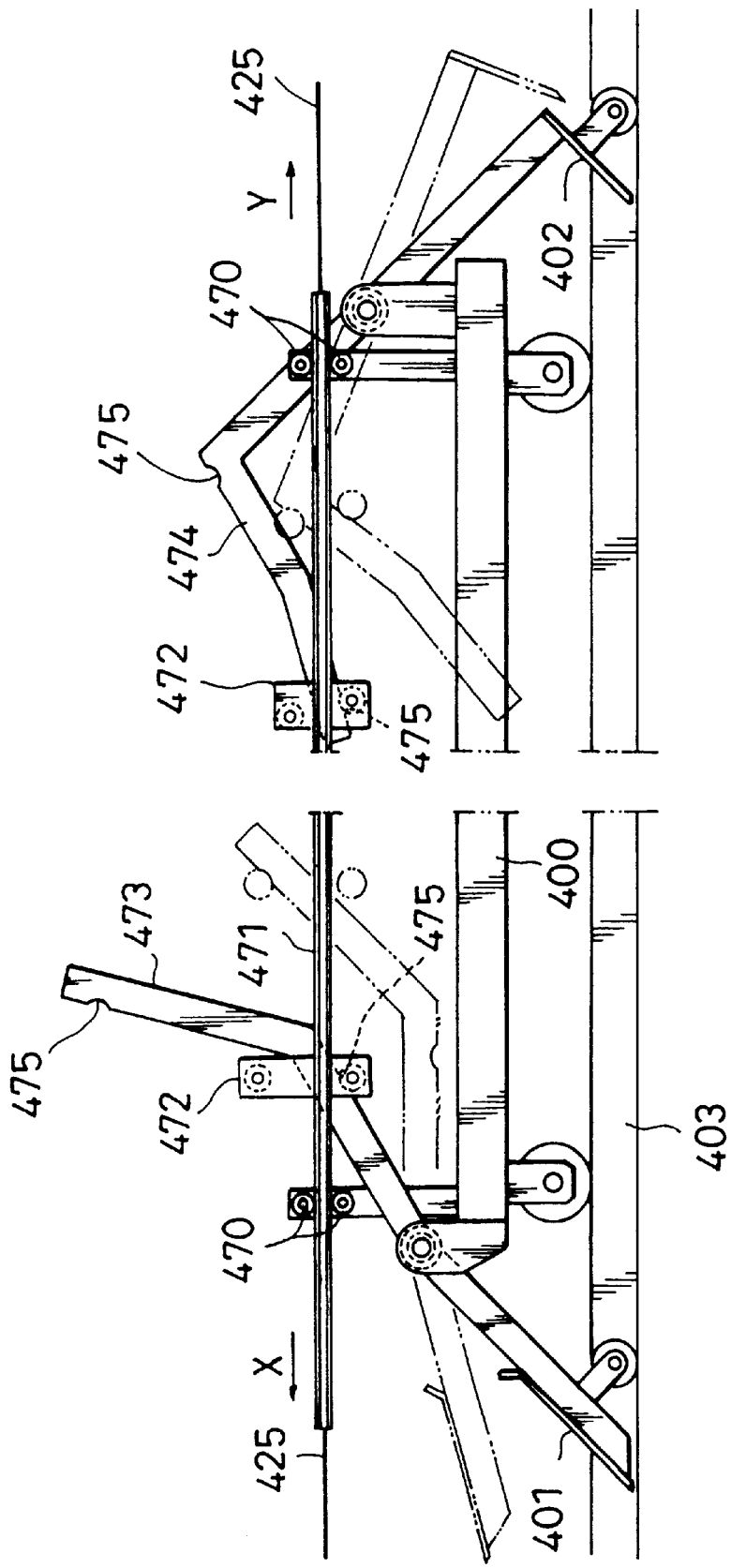
FIG. 28 is an enlarged front view of the main part of a sludge collecting apparatus of a further embodiment.
Figure 29:
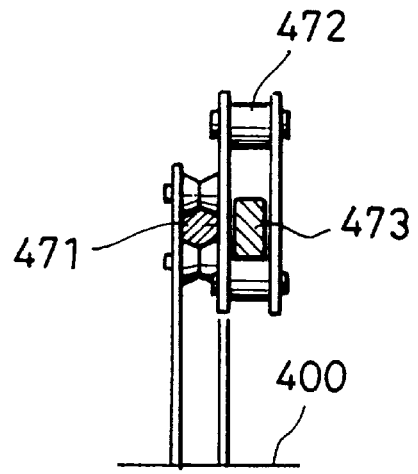
FIG. 29 is a partial enlarged side view of a part around the shift shaft of the sludge collecting apparatus of FIG. 28.

According to an embodiment shown in FIG. 28, a shift shaft 471 is guided by guide rollers 470 fixed on the vehicle body 400 side so as to be movable forward and backward and, as illustrated in FIG. 29, elevating roller sets 472 are provided at two positions in the side surface of the shift shaft 471. Front interlocking levers 473 and 474 are inserted into the elevating roller sets 472 with a clearance. As shown in FIG. 28, the levers 473 and 474 are swung up and down by the advance and retreat of the shift shaft 471, thereby enabling the front and rear sludge scrapers 401 and 402 to be switched between the collecting state and the noncollecting state. In the case of the embodiment, when the system of stopping the rotation of the shift shaft 471 and the guide rollers 470 as shown in FIG. 29 is used, it is unnecessary to provide the accompanying means as shown in FIG. 27. For stabler driving, however, accompanying means may be provided.

In each of the interlocking levers 473 and 474, a recess 475 in which the roller in the elevating roller set 472 fits at the elevating end can be formed for stable operation.

Figure 30:
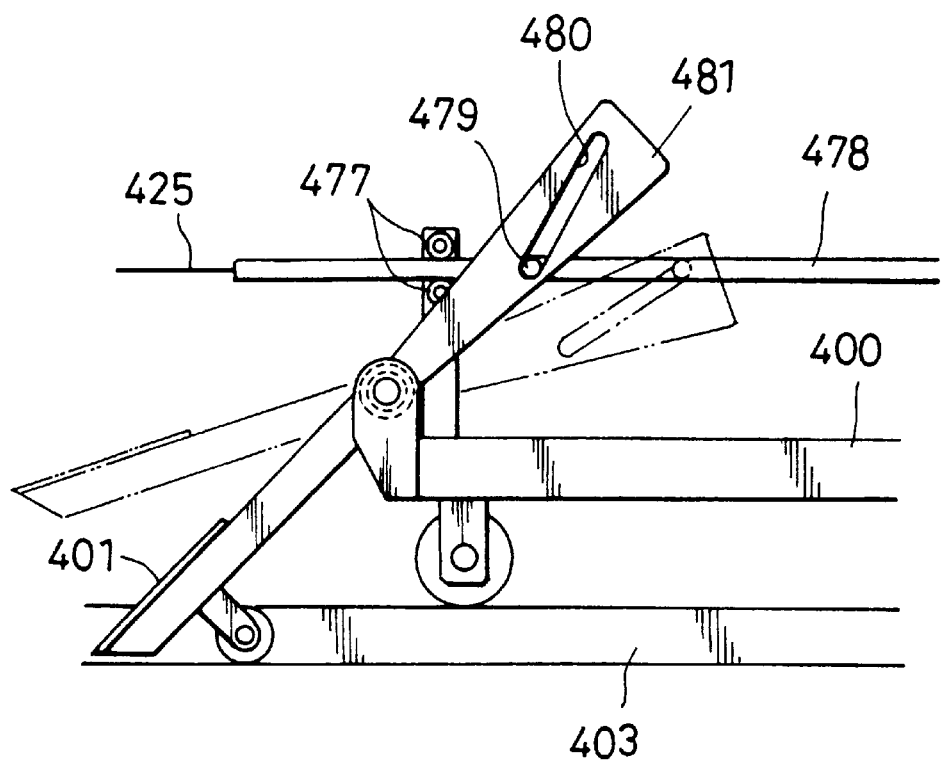
FIG. 30 is a partial enlarged front view of a sludge collecting apparatus of a further embodiment.

Another interlocking system of an embodiment shown in FIG. 30 may be used. A shift shaft 478 is allowed to travel forward and backward at a predetermined stroke by guide rollers 477, and a front interlocking lever 481 having a long hole 480 in which a swing pin 479 of the shift shaft 478 slides while being engaged and a rear interlocking lever (not shown) are provided. In the case of the embodiment as well, the accompanying means is not necessary.

Figure 31:
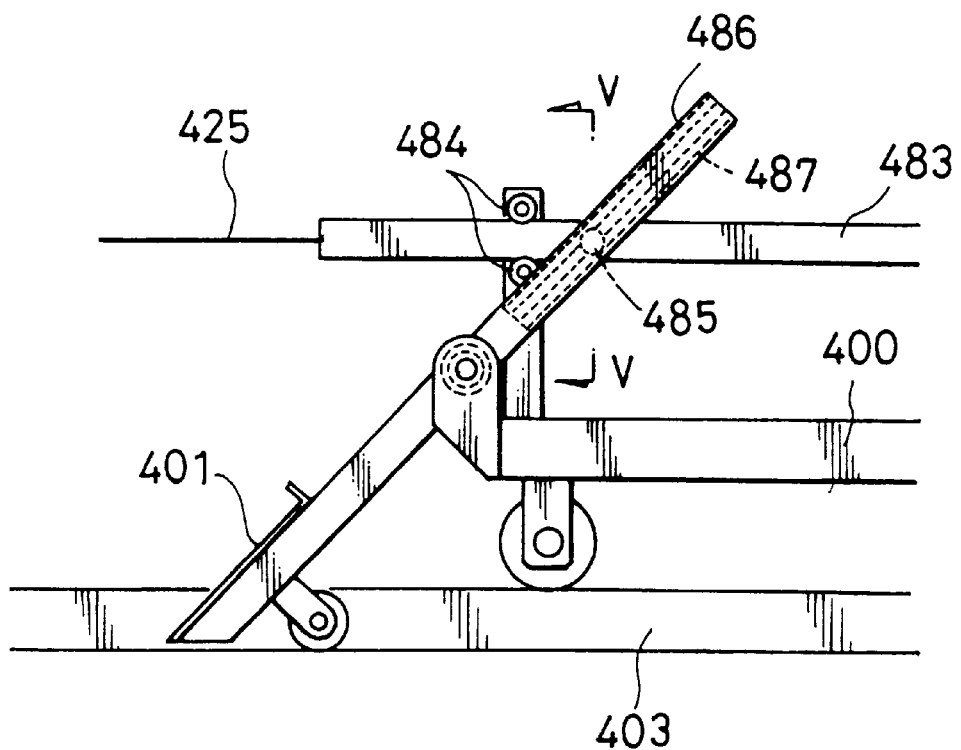
FIG. 31 is a partial enlarged front view of a sludge collecting apparatus of a further embodiment.
Figure 32:
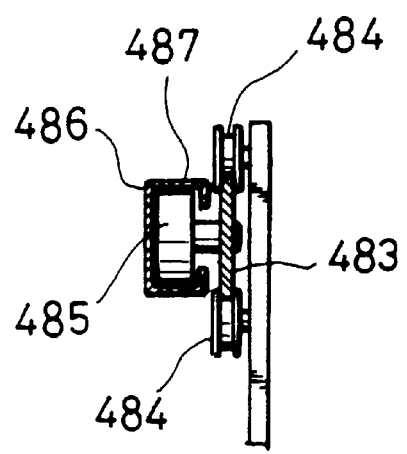
FIG. 32 is a partial enlarged side view of a groove guide part in the sludge collecting apparatus of FIG. 31.

According to an embodiment shown in FIGS. 31 and 32, a band-plate shaped shifter 483 is provided between wire ropes 425 and is moved forward and backward by guide rollers 484. A groove guide 487 having a cross-sectional shape similar to a channel member with lips is formed on a front interlocking lever 486 side for a swing roller 485 protruded from the shifter 483 so that the swing roller 485 fits in the groove guide 487. In the case of the embodiment as well, although the accompanying means is not necessary, it may be provided.

What is claimed is:

1. A sludge collecting apparatus comprising:
   a vehicle body and reciprocating driving means disposed in a treatment tank, the treatment tank being generally rectangular, havinig a bottom and a sludge collecting pit located at one longitudinal direction, the vehicle body having a width extending substantially the entire width of the bottom of the treatment tank and configured to travel back and forth along the longitudinal axis of the bottom of the treatment tank in a plane immediately above and parallel to the bottom;
   two or more sludge scrapers disposed at regular intervals along the direction of travel, the intervals less than the travel of the vehicle body, each scraper rotatably attached to the vehicle body about an axis that is generally transverse to the direction of travel and is movable between an orientation to move sludge that becomes deposited on the bottom of the treatment tank toward and into the sludge collecting pit when the vehicle body travels in a first direction and an orientation in which the scraper passes above the sludge when the vehicle body travels in a second, substantially parallel direction;
   wherein the length of the vehicle body measured along the direction of travel is greater than the width of the vehicle body;
   the vehicle body having two lever members rotatably attached thereto, one lever member disposed at each transverse end of the vehicle body; and
   a mechanical linking means that interengages the driving means, lever members, and each sludge scraper configured such that each sludge scraper is simultaneously deployed in the same orientation.

2. The sludge collecting apparatus of claim 1, wherein the lever means are rotatably attached to the vehicle body about an axis in a plane perpendicular to the direction of travel of the vehicle body.

3. The sludge collecting apparatus of claim 1, wherein the mechanical linking means includes at least one of a wire rope, a rod, or a chain.

4. The sludge collecting apparatus of claim 1, wherein a scum scraper is rotatably attached above the vehicle body and to a rotating means and is configured such that the scum scraper can rotate between a position wherein the scum scraper can pass beneath any scum that accumulates on the surface of the liquid contents of the treatment tank, when the vehicle body travels in the first direction and a position wherein the scum scraper can collect and transport the scum when the vehicle body travels in the second direction; and
   the vehicle body travels along a plurality of guide rails attached to the bottom of the treatment tank.

5. The sludge collecting apparatus of claim 1, wherein the portion of the reciprocating driving means that is within the contents of the treatment tank is rotational.

6. The sludge collecting apparatus of claim 1, wherein a scum scraper is rotatably attached above the vehicle body and interengaged with the mechanical linking means and configured such that the scum scraper can rotate between a position wherein the scum scraper can pass beneath any scum that accumulates on the surface of the liquid contents of the treatment tank when the vehicle body travels in the first direction and a position wherein the scum scraper can collect and transport the scum when the vehicle body travels in the second direction.

7. The sludge collecting apparatus of claim 1, wherein the vehicle body travels along a plurality of guide rails attached to the bottom of the tank.

8. The sludge collecting apparatus of claim 7, wherein single guide rail is disposed on substantially the center of the bottom of the treatment tank in the direction of the travel of the vehicle body.

9. The sludge collecting apparatus of claim 1, wherein the vehicle body is divided in a plurality of sections and the sections are coupled by coupling members.

10. The sludge collecting apparatus of claim 1, wherein the sludge scrapers are inclined into the direction of travel of the vehicle body when the vehicle body travels in the first direction.

11. The sludge collecting apparatus of claim 1, wherein the mechanical linking means is a wire rope attached to a shifter that can reverse the direction of travel of the vehicle body and the orientation of the sludge scrapers.

12. A sludge collecting apparatus comprising:
  a vehicle body and reciprocating driving means disposed in a treatment tank, the treatment tank being generally rectangular, having a bottom and a sludge collecting pit located at one longitudinal end of the bottom, the vehicle body traversing substantially the entire width of the bottom of the treatment tank and configured to travel back and forth along the longitudinal axis of the bottom of the treatment tank in a plane immediately above and parallel to the bottom;
  two or more sludge scrapers disposed at regular intervals along the direction of travel, the intervals less than the travel of the vehicle body, each scraper rotatably attached to the vehicle body about an axis that is generally transverse to the direction of travel and is movable between an orientation to move sludge that becomes deposited on the bottom of the treatment tank toward and into the sludge collecting pit when the vehicle body travels in a first direction and an orientation in which the scraper passes above the sludge when the vehicle body travels in a second, substantially parallel direction;
  wherein the dimension of the vehicle body measured along the direction of travel is greater than the width of the vehicle body;
  the vehicle body having two lever members rotatably attached thereto, one lever member disposed at each transverse end of the vehicle body;
  a mechanical linking means that interengages the driving means, lever members, and each sludge scraper configured such that each sludge scraper is simultaneously deployed in the same orientation; and
  wherein the lever members are rotatably attached about a vertical axis that lies in a plane substantially perpendicular to the bottom of the treatment tank.

13. The sludge collecting apparatus of claim 12, wherein the mechanical linking means includes at least one of a wire rope, a rod, or a chain.

14. The sludge collecting apparatus of claim 12, wherein a scum scraper is rotatably attached above the vehicle body and interengaged with the mechanical linking means and configured such that the scum scraper can rotate between a position wherein the scum scraper can pass beneath any scum that accumulates on the surface of the liquid contents of the treatment tank,
  when the vehicle body travels in the first direction and a position wherein the scum scraper can collect and transport the scum when the vehicle body travels in the second direction; and
  the vehicle body travels along a plurality of guide rails attached to the bottom of the treatment tank.

* * * * *

UNITED STATES PATENT AND TRADEMARK OFFICE
CERTIFICATE OF CORRECTION

PATENT NO. : 6,199,704 B1  
DATED : March 13, 2001  
INVENTOR(S) : Michihiro Fujiwara Page 1 of 1

It is certified that error appears in the above-identified patent and that said Letters Patent is hereby corrected as shown below:

Column 12,
Line 7, "ajoint" should read -- a joint --.

Column 18, claim 1,
Line 5, "havinig" should read -- having --.

Column 20, claim 14,
Line 23, "conifigured" should read -- configured --.

Signed and Sealed this

Fourth Day of December, 2001

Attest:

*Nicholas P. Godici*

NICHOLAS P. GODICI
*Attesting Officer*   *Acting Director of the United States Patent and Trademark Office*